United States Patent
Tkalya et al.

(10) Patent No.: US 11,866,385 B2
(45) Date of Patent: Jan. 9, 2024

(54) COATED AGROCHEMICAL COMPOSITION

(71) Applicant: EVERRIS INTERNATIONAL B.V., Heerlen (NL)

(72) Inventors: Evgeniy Tkalya, Eindhoven (NL); Ronald Petrus Johannes Gosens, Gilze (NL); Susan Tine Kathelyne Sijstermans, Geleen (NL); Michael Ernest Josephina Hendriks, Geleen (NL); Martin Anna Fransiscus Jacobus. Marx, Berg aan de Maas (NL); Karina Rabe, Aachen (DE); Gerardus Jacobus Joseph Out, Sittard (DE)

(73) Assignee: EVERRIS INTERNATIONAL B.V., Heerlen (NL)

( * ) Notice: Subject to any disclaimer, the term of this patent is extended or adjusted under 35 U.S.C. 154(b) by 429 days.

(21) Appl. No.: 16/760,941

(22) PCT Filed: Oct. 30, 2018

(86) PCT No.: PCT/EP2018/079682
§ 371 (c)(1),
(2) Date: May 1, 2020

(87) PCT Pub. No.: WO2019/086440
PCT Pub. Date: May 9, 2019

(65) Prior Publication Data
US 2020/0308076 A1 Oct. 1, 2020

(30) Foreign Application Priority Data

Nov. 1, 2017 (EP) .................. 17199572

(51) Int. Cl.
*C05G 5/30* (2020.01)
*A01N 25/10* (2006.01)
*A01N 25/28* (2006.01)
*C08G 18/38* (2006.01)

(52) U.S. Cl.
CPC .............. *C05G 5/37* (2020.02); *A01N 25/10* (2013.01); *A01N 25/28* (2013.01); *C08G 18/3876* (2013.01)

(58) Field of Classification Search
CPC .... C08G 75/045; C08G 18/3876; C05G 5/37; A01N 25/28
See application file for complete search history.

(56) References Cited

U.S. PATENT DOCUMENTS

| | | |
|---|---|---|
| 3,223,518 A | 12/1965 | Hansen. |
| 4,019,890 A | 4/1977 | Fujita et al. |
| 4,657,576 A | 4/1987 | Lambie |
| 4,772,490 A | 9/1988 | Kögler et al. |
| 5,538,531 A | 7/1996 | Hudson et al. |
| 5,645,624 A | 7/1997 | Naka et al. |
| 6,503,288 B1 | 1/2003 | Markusch |
| 7,713,326 B2 * | 5/2010 | Carstens ................ C05G 5/37 554/102 |
| 7,989,655 B2 | 8/2011 | Refvik et al. |
| 8,399,020 B2 | 3/2013 | Driessen et al. |
| 9,266,787 B2 | 2/2016 | Pursell et al. |
| 2007/0021521 A1 | 1/2007 | Cheng et al. |
| 2016/0068639 A1 * | 3/2016 | Bowman ................ A01N 25/04 424/93.1 |
| 2016/0280954 A1 * | 9/2016 | Walther ................ C09J 133/14 |
| 2017/0247541 A1 * | 8/2017 | Bowman ................ C05G 5/23 |

FOREIGN PATENT DOCUMENTS

| | | |
|---|---|---|
| CN | 101061141 A | 10/2007 |
| CN | 105518037 A | 4/2016 |
| EP | 0931036 A1 | 7/1999 |
| GB | 954555 A | 4/1964 |
| JP | S5667333 A | 6/1981 |

OTHER PUBLICATIONS

Matthew J. Kade et al: The power of thilol-ene chemistry—Jorunal of Polymer Science Part A—Polymer Chemistry vol. 48 No. 4 Feb. 15, 2010 pp. 743-750.
List of Abstracts of Dr van der Ende Alice E; Harrell Jameson; 1-17.

* cited by examiner

*Primary Examiner* — Mark V Stevens
*Assistant Examiner* — Alparslan Asan
(74) *Attorney, Agent, or Firm* — HOYNG ROKH MONEGIER B.V.; David P. Owen

(57) ABSTRACT

A coating composition comprising an adduct formed by chemical reaction of a monomer containing poly-thiol with a monomer containing one or more unsaturated carbon-carbon bond; more particularly relates to coated agrochemical compositions coated with said coating composition.

15 Claims, 4 Drawing Sheets

COATED AGROCHEMICAL COMPOSITION

FIELD OF THE INVENTION

The present invention generally relates to a coating composition comprising an adduct formed by chemical reaction of a monomer containing poly-thiol with a monomer containing one or more unsaturated carbon-carbon bond; more particularly relates to agrochemical compositions coated with said coating composition.

BACKGROUND ART

Using controlled release fertilizer compositions to provide nutrients in growing media is well known. A controlled release fertilizer (CRF) is commonly defined as a fertilizer granule with a coating, usually a polymer coating, thereby controlling the water penetration into the fertilizer and its release. CRF is known to be a very effective source for providing nutrients to growing plants, since nutrients are released at controlled rates, resulting in sustained feeding of plants. A single application of CRF can provide the necessary nutrients that would take multiple applications of uncoated fertilizers.

Recent developments on the regulatory front in Europe require fertilizer coating compositions having controlled release properties to additionally have biodegradability properties. For example, the EU commission proposed in their draft EU Regulation of CE marked fertilizing products (March 2016) to set a requirement that polymer coatings should be capable of undergoing physical, biological decomposition, such that most of it ultimately decomposes into carbon dioxide ($CO_2$), biomass and water.

Currently available CRF in the market have polymer coating compositions based on alkyd chemistry, a cross-linked vegetable oil (GB954555A, U.S. Pat. Nos. 3,223,518A, 4,657,576A), polyolefins (U.S. Pat. No. 4,019,890A) or polymer coating compositions based on reactive monomers like polyurethanes (U.S. Pat. Nos. 4,772,490A, 5,538531A). Such coating compositions biodegrade very slowly (Terlingen et al., Proceedings International Fertilizer Society 781, 1-24 (2016), and do not conform with the EU draft regulation.

U.S. Pat. Nos. 7,989,655B2 and 7,713,326B2 describe thiol ester compositions and processes for making and using same on controlled release fertilizers. It is described that thiol ester compositions are prepared by radical initiation from synthetic unsaturated esters and mercaptans. The thiol ester compositions are reacted with isocyanates to form polythiourethane encapsulated controlled release fertilizers. It is known by those skilled in the art that due to the resistance of the thiourethane bond towards hydrolysis, the resulting polythiourethane coating is not biodegradable.

U.S. Pat. No. 5,645,624A describes the application of a first layer of polylactic acid (PLA) from solvent followed by a top coating of a non-water soluble slowly degrading material, for instance wax. Hardly any visual biodegradation of the 2-layered coating was seen after 4.5 months being buried in soil.

U.S. Pat. No. 9,266,787B2 followed a similar approach with a coating of PLA-oligomers from a melt and a wax top layer on fertilizer granules. However, 2 h nutrient release tests in water at 20-25° C. show between 5-80% urea release at a coat level of 2.3% PLA and 1% polyvinylacetate and between 7-70% urea release at a coat level of 4.7% PLA and 2% paraffin wax, which is quite variable. Moreover, biodegradation was not shown.

EP931036 describes polyester dispersions in water based on aliphatic and aromatic units (for example, 1,4-butane diol with adipic acid and terephtalic acid) for coating fertilizer granules. The examples show 25-35% release of fertilizer in 7 days but the amount of coating is not disclosed. Moreover, no information on biodegradation is given, but it can be expected that such polyester based coatings are comparable to alkyd coatings, described above.

U.S. Pat. No. 6,503,288B1 discloses a process for biodegradable polyurethane encapsulated fertilizer particles. However, the biodegradability is not described. Moreover it is known that polyurethane coatings are difficult to biodegrade by micro-organisms (for example see N. Mahajan, P. Gupta: "*New insights into the microbial degradation of polyurethanes*", *RSC Adv.*, 2015, 5, 41839). In addition, the barrier properties of the coating are poor, after 20 hours in water at room temperature already 11% of the fertilizer is released from a fertilizer with 12% coating.

Thus, there is an existing need in the field of agrochemical products, for a biodegradable coating composition for application on fertilizer granules that provides adequate protection against moisture to get the desired controlled nutrient release properties.

In particular, it is desirable to manufacture coated agrochemical compositions, where their coatings or the entire coated agrochemical compositions have desired biodegradability behavior and simultaneously have desired mechanical properties to impart controllable release over a desired period of time.

More particularly, it is desirable to manufacture coated granular fertilizer compositions to have desired biodegradability behavior and controlled nutrient release behavior over a desired period of time.

The present invention provides such coating compositions, coated agrochemical compositions, CRFs, and their methods of manufacturing that solve one or more of the problems mentioned above. Other features and advantages of the invention will be apparent from the following description and from the claims.

BRIEF DESCRIPTION OF THE DRAWINGS

The features and advantages of the invention will be appreciated upon reference to the following figures, in which.

DESCRIPTION OF ILLUSTRATIVE EMBODIMENTS

Figure 1:
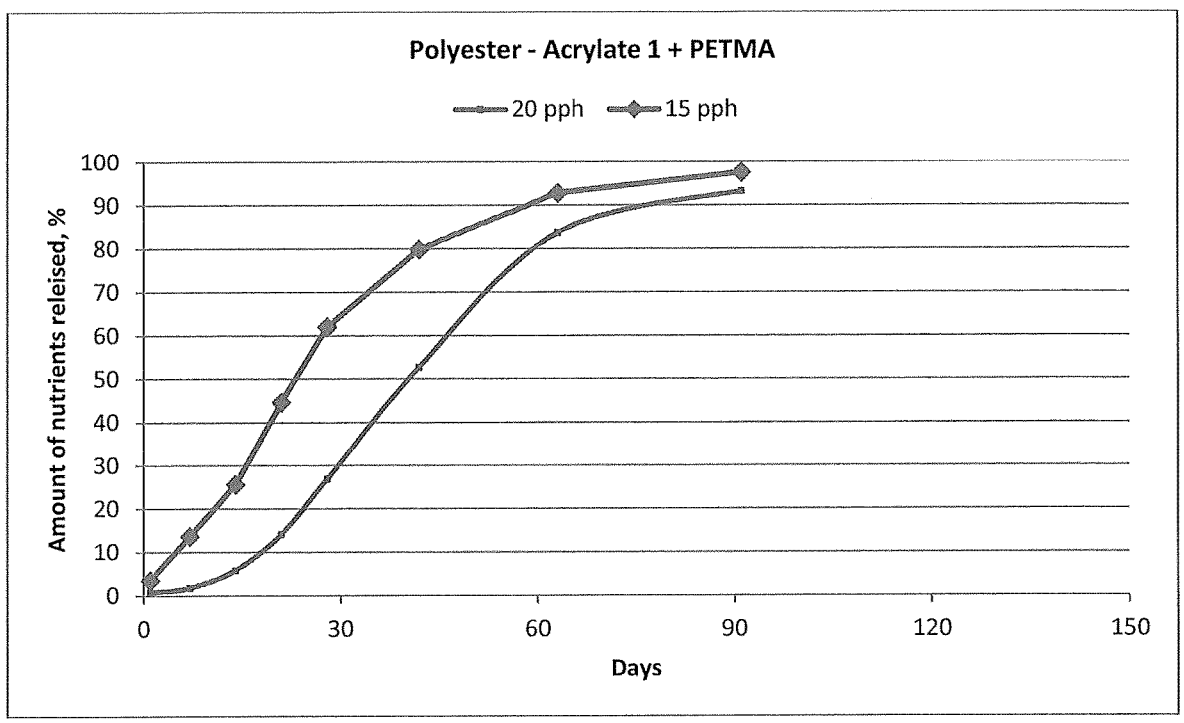
FIG. 1 shows controlled release of nutrients at 21° C. by fertilizer granules coated with the reaction product of pentaerythritol tetrakis (2-mercaptoacetate) (PETMA) and Polyester-Acrylate-1, a coating according the present invention.

In one aspect of the present invention, a biodegradable coating composition having a controlled rate of release is provided. The coating composition of the invention comprises an adduct formed by chemical reaction of monomer A comprising a component having at least two mercaptoalkanoate groups with monomer B comprising a component having one or more ester moieties, and an unsaturated carbon-carbon bond.

In a preferred embodiment, the coating composition exhibits at least about 16% biodegradation within a time period from about 10 to 24 months, preferably, measured at ambient temperature between 20 and 28° C. in accordance with ISO 14855 which is part of the CEN method EN 13432, ASTM D-5338.98, ISO 17556, ASTM D5988, UNI 11462, or NF U52-001 and wherein the coating composition is adapted to have controlled rate of release. The coating composition of the present invention has a thickness and fotijiulation sufficient to act as a controlled release protective layer for fertilizers.

As used herein, the term "adduct" is the chemical reaction product formed from the reactants, e.g. components of monomer A and monomer B. The adduct is a new compound having a separate entity than the reactants. The chemical reaction can proceed for example via Michael addition or free radical polymerization.

The term "monomer" as used herein generally includes monomers capable of becoming covalently linked to a growing polymer chain in a chemical process such as Michael addition or radical polymerization. The term also includes a monomer capable of effecting growth of a polymer chain as well as a monomer capable of effecting chain growth and branching. The teim "monomer" further includes mixtures of different particular monomer species. The skilled artisan is well aware of such mixtures and routinely applies particular ratios of monomers having functional groups depending on the desired degree of branching.

As used herein, the terms "biodegradation", "biodegradable", "biodegradability" and the like refer to breakdown of a coating composition by microorganisms in the presence of oxygen into carbon dioxide, water, and mineral salts of any other elements present (mineralization) and new biomass. For some polymeric systems the biodegradation starts with hydrolysis of the polymeric chain under formation of carboxylic acids and alcohols.

Biodegradation rate can be measured via various known methods according to different standards. Biodegradation rate of the coating compositions of the present invention are determined, for example, in accordance with ISO 14855-2005 (Determination of the ultimate aerobic biodegradability and disintegration of plastics under controlled composting conditions) which is part of the CEN method EN 13432-2000, ASTM D-5338.98 (standard test method for determining aerobic biodegradation of plastic materials under controlled composting conditions), DIN EN ISP ISO 17556-2012 (ultimate aerobic biodegradability of plastic materials in soil by oxygen consumption or evolved carbon dioxide); ASTM D5988-12 (method for determining aerobic biodegradation of plastic material in soil), UNI 11462-2012 (Plastic materials biodegradable in soil—Types, requirements and test methods), and NF U52-001 (February 2005 Biodegradable materials for use in agriculture and horticulture—Mulching products—Requirements and test methods). All of the above-mentioned standardized methods are incorporated by reference in their entirety.

For example, the coating composition or the coated agrochemical composition (e.g. coated granular fertilizer composition) is mixed with the soil. The mixture is allowed to stand in a flask over a period of time during which the amount of oxygen consumed (Biological Oxygen Demand (BOD)) or the amount of carbon dioxide evolved is determined Provided the $CO_2$ evolved is absorbed, the BOD can be determined, for example, by measuring the amount of oxygen required to maintain a constant gas volume in a respirometer flask, or by measuring either automatically or manually the change in volume or pressure (or a combination of the two). The amount of carbon dioxide evolved is measured at intervals dependent on the biodegradation kinetics of the test substance by passing carbon-dioxide-free air over the soil and then determining the carbon dioxide content of the air by a known method. The level of biodegradation, expressed as a percentage, is determined by comparing the BOD with the theoretical oxygen demand (ThOD: maximum theoretical amount of oxygen required to oxidize a chemical compound completely, calculated from the molecular formula) or by comparing the amount of carbon dioxide evolved with the theoretical amount (ThCO2: maximum theoretical amount of carbon dioxide evolved after completely oxidizing a chemical compound, calculated from the Total Organic Carbon (TOC) content). The test is terminated when a constant level of biodegradation has been attained within certain number of months.

The coating compositions made with the monomers of present invention exhibit "biodegradation", "biodegradability behavior" and the like, which terms refer to biodegradability under the defined conditions meeting at least the following criteria: at least about 16% biodegradation of the coating compositions and/or the agrochemical compositions coated with the coated composition within a time period from about 10 to 24 months. Such biodegradation can be measured at ambient temperature between 20 and 28° C. in accordance with testing methods such as ISO 14855, ISO 17556, ASTM D5988, UNI 11462, or NF U52-001.

Preferably, the present invention provides a coating composition and/or an agrochemical composition with said coating composition that has a minimum of about 16%, 20%, 30%, 40%, 50%, 60%, 70%, 80%, or 90% biodegradation within a time period from about 10 to 24 months, optionally, about 10 months, about 11 months, about 12 months, about 13 months, about 14 months, about 15 months, about 16 months, about 17 months, about 18 months, about 19 months, about 20 months, about 21 months, about 22 months, about 23 months, or about 24 months, optionally obtained at temperature between 20° C. and 28° C.

Preferably, the coating composition, and/or an agrochemical composition with said coating composition exhibits a minimum of about 40% biodegradation in between 10-24 months, and even more preferable of about 90% biodegradation in between 10-24 months.

The term "about" as used herein, refers to any value which lies within the range defined by a variation of up to ±10% of the value.

As used herein, the term "release" according to the present invention refers to transfer of a material(s) (e.g. nutrient, fertilizer) from the coated agrochemical composition to a receiving medium, e.g. soil or water. The coating prepared with the monomers of present invention exhibit "controlled rate of release", "controlled release properties", obey "controlled release criteria" and the like, which terms refer to release under the defined conditions meeting at least the following criteria:

(1) not more than 15 weight percent (wt. %) of the core material is released from the coated agrochemical composition within the first 24 hours after initial contact of the coated agrochemical composition with moisture or water, at ambient temperature (temperature between 20° C. and 28° C.); and (2) not more than 75 weight percent (wt. %) of the core material is released from the coated agrochemical composition within 28 days after initial contact of the coated agrochemical composition with moisture or water, at ambient temperature; and (3) at least 75 weight percent (wt. %), optionally at least 80 wt. %, or at least 90% of the core material is released from the coated agrochemical composition at a predetermined time, preferably at 30 days or more after initial contact of the coated agrochemical composition with moisture or water, at ambient temperature.

The term "longevity" as employed herein defines the time at 30 days between initial contact of a material with moisture or water and the time at which about 75 weight percent (wt. %) of the material such as fertilizers, insecticides, herbicides, fungicides, pheromones, biostimulants, growth regulators and the like and mixtures thereof is released. Determination of the release of the materials such as fertilizers from the coated agrochemical composition of present invention is, preferably, in accordance with NEN-EN 13266, November 2001, which is incorporated by reference in its entirety.

Preferably, the monomer A comprises a compound having at least two mercaptoalkanoate groups. Preferably, the monomer A comprises a compound having linear or branched alkyl polymercaptoalkanoates, linear or branched alkylene oxide polymercaptoalkanoates or polyester polymercaptoalkanoates.

Generally, the number of mercaptoalkanolate groups of momomer A is between 2 and 8, preferably between 2 and 6, and even more preferably between 2 and 4. It is understood that monomers as commercially available may be mixtures of compounds, and the average number of mercaptoalkanolate groups in a monomer mixture may be about 3, which means that about half of the molecules in said mixture has a number of mercaptoalkanolate groups of 2 and half of the molecules have 4 mercaptoalkanolate groups.

The molecular weight of monomer A preferably is between 200 and 2000 g/mole, preferably between 200 and 1000 g/mole. Preferably, the monomer A has a melting point below 60 degrees Celsius (C), preferably below 50 degrees C.

Preferably, the monomer A of present invention comprises a component represented by following structure:

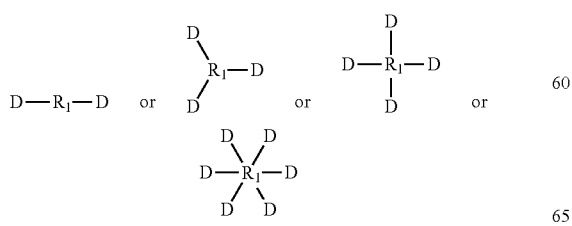

wherein,
D is represented by following structure:

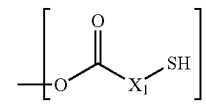

$X_1$ is a linear or branched aliphatic carbon chain ranging from 1 to 20 carbon atoms;
$R_1$ is represented by the following structure:

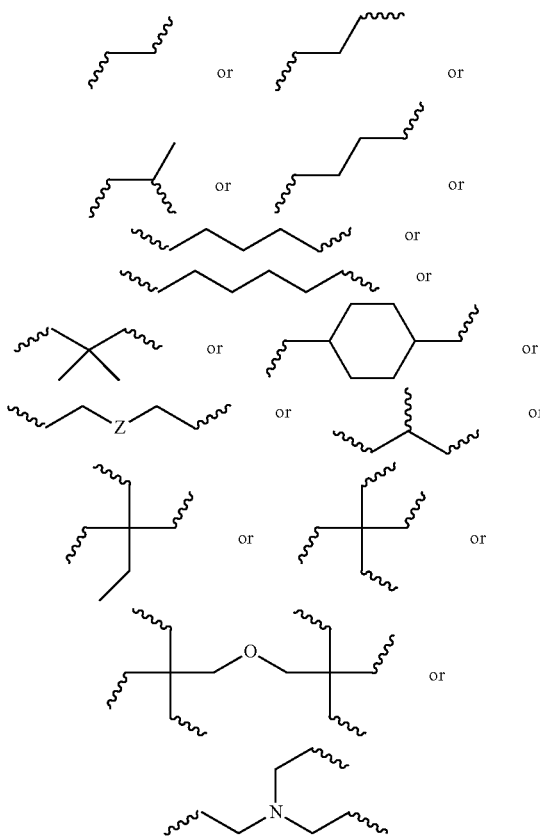

wherein Z=O, S, NH, N-methyl, N-ethyl, N-propyl, N-isopropyl

The wavy line symbol "∿" indicates a bond linked directly or indirectly to D. Optionally, D is linked directly to $R_1$. Optionally, D is connected indirectly to $R_1$. The term "indirectly" in this context shall mean there is at least one additional carbon between D and $R_1$.

$R_1$ generally comprises 2-36 carbon atoms and 0-5 oxygen, 0-3 nitrogen or alkylated nitrogen, or 0-3 sulfur atoms. Preferably, $R_1$ comprises 2-10 carbon atoms and 0-1 oxygen or nitrogen atom.

Preferably, the monomer A comprises commercially available ethylene glycol bis(2-mercaptoacetate) (GDMA) represented by the following structure:

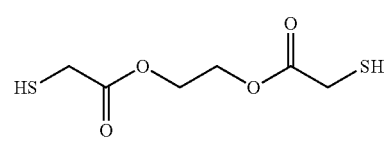 [SMILES: O=C(CS)OCCOC(=O)CS]

Preferably, the monomer A comprises commercially available trimethylolpropane tris(2-mercaptoacetate) (TMPTMA) represented by the following structure:

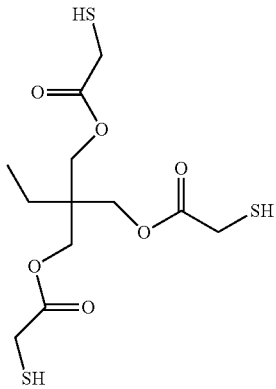 [SMILES: CCC(COC(=O)CS)(COC(=O)CS)COC(=O)CS]

Preferably, the monomer A comprises commercially available pentaerythritol tetrakis(2-mercaptoacetate) (PETMA) represented by the following structure:

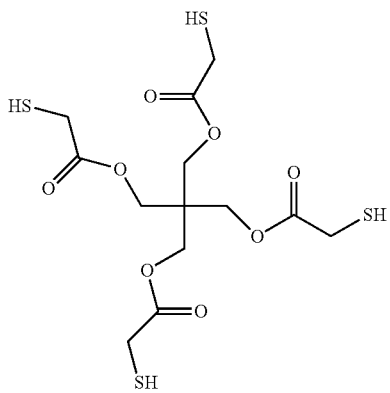 [SMILES: O=C(CS)OCC(COC(=O)CS)(COC(=O)CS)COC(=O)CS]

Preferably, the monomer A comprises commercially available pentaerythritol tetrakis(3-mercaptopropionate) (PETMP) represented by the following structure:

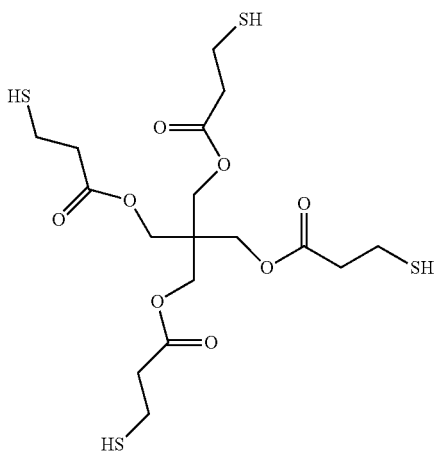 [SMILES: O=C(CCS)OCC(COC(=O)CCS)(COC(=O)CCS)COC(=O)CCS]

Preferably, the monomer A comprises commercially available trimethylolpropane tris(3-mercaptopropionate) (TMPTMP) represented by the following structure:

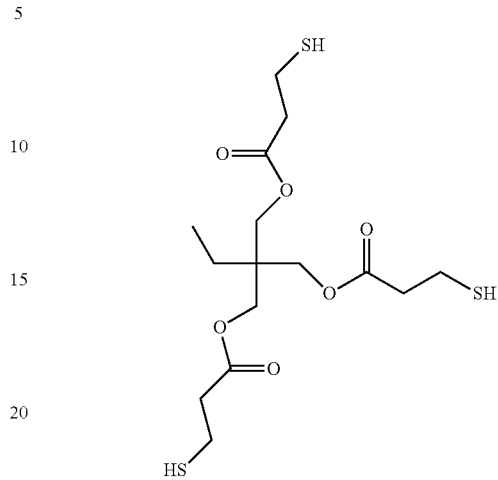

Preferably, the monomer A comprises commercially available ethylene glycol bis(3-mercaptopropionate) (GDMP) represented by the following structure:

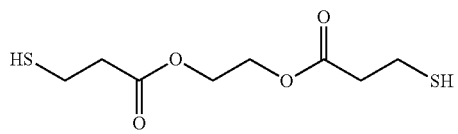 [SMILES: O=C(CCS)OCCOC(=O)CCS]

Preferably, the monomer B of the present invention comprises a component having an ester moiety and an unsaturated carbon-carbon bond. Preferably, the monomer B of the present invention comprises a component having at least two ester moieties. Generally, the monomer B comprises a component having at least two unsaturated carbon-carbon double bonds in order to provide for a polymer together with monomer A. Optionally, the unsaturated carbon-carbon bond of the component of monomer B comprises (meth) acrylate and/or maleate functionality Generally, the number of unsaturated groups of monomer B is between 2 and 8, preferably between 2 and 6, and even more preferably between 2 and 4. It is understood that monomers as commercially available may be mixtures of compounds, and the average number of unsaturated groups in a monomer mixture may be about 2.5, which means that about half of the molecules in said mixture has a number of unsaturated groups of 2 and half of the molecules have 3 unsaturated groups.

Generally, the number of ester groups of monomer B is between 2 and 50, preferably between 2 and 20, and even more preferably between 2 and 8. The molecular weight of monomer B preferably is between 200 and 5000 g/mole, preferably between 200 and 2000 g/mole. Preferably, the monomer B has a melting point below 60 degrees C., preferably below 50 degrees C.

Preferably, the monomer B of the present invention comprises a component having general structure represented by following:

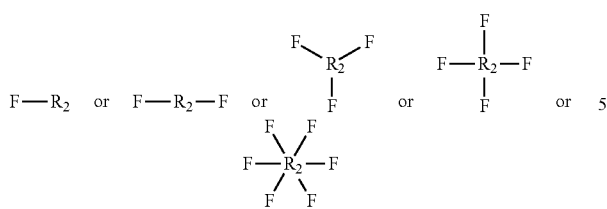

wherein,
F is represented by the following structure:

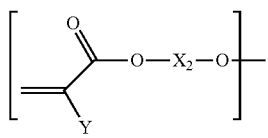

$X_2$ is an oligo or polyester, optionally, formed by chemical reaction of 1) linear, branched, or alicyclic polyacids ranging from $C_2$ to $C_{36}$, which may contain unsaturated carbon-carbon bond(s), amide bond(s), urea bond(s), urethane bonds, ester bond(s), carbonate bond(s), ether bonds, or mixtures thereof and 2) linear, branched, or alicyclic polyols ranging from $C_2$ to $C_{36}$, which may contain unsaturated carbon-carbon bond(s), amide bond(s), urea bond(s), urethane bond(s), carbonate bond(s), ether bonds; or formed by chemical reaction of lactones having 4-8 carbon atoms or farmed by chemical reaction of linear or branched hydroxyalkanoic acids having 2-8 carbon atoms.

Y is H or $CH_3$;
$R_2$ is represented by the following structure:

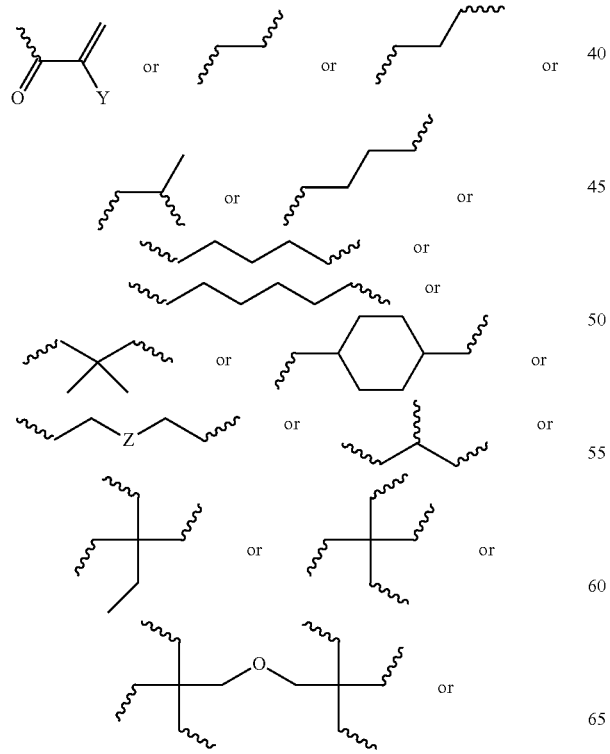

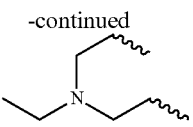

wherein Z=O, S, NH, N-methyl, N-ethyl, N-propyl, N-isopropyl

The wavy line symbol "〰" indicates a bond linked directly or indirectly to F. Optionally, F is linked directly to $R_2$. Optionally, F is connected indirectly to $R_2$. The term "indirectly" in this context shall mean there is at least one additional carbon between F and $R_2$.

Preferably, the monomer B comprises a component having a functionalized caprolactone represented by the following structure:

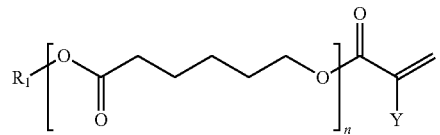

wherein,
n is an integer more than 1, optionally between 1 to 50;
Y is H or $CH_3$,
$R_1$ is represented by the following structure:

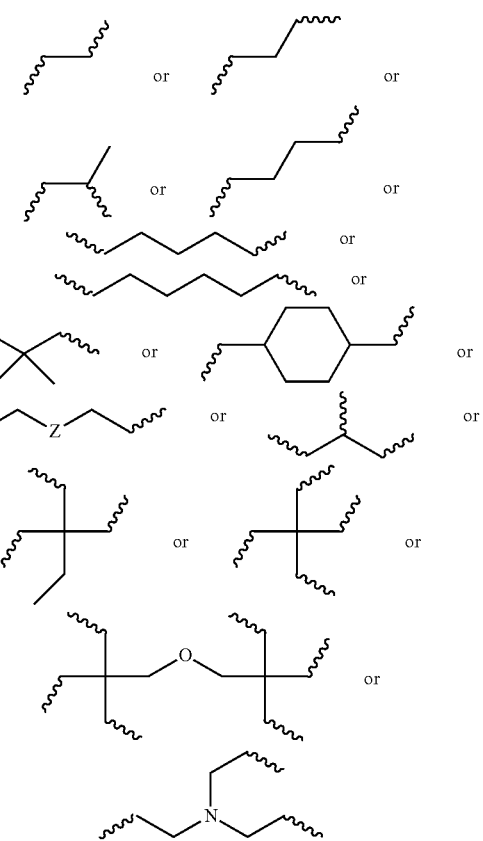

wherein Z=O, S, NH, N-methyl, N-ethyl, N-propyl, N-isopropyl

The wavy line symbol "〰" indicates a bond between $R_1$ and the functionalized caprolactone.

Preferably, the monomer B comprising a component having an ester moiety, a cyclopentane and/or cyclohexane moiety, and an unsaturated carbon-carbon bond.

Preferably, the monomer B comprises a component having 5- or 6-membered cycloalkyl moiety with at least two (meth)acrylate end groups or having 5- or 6-membered cycloalkyl moieties separated by 1-9 ester bonds and has at least two acrylate or methacrylate end groups.

Preferably, the monomer B of present invention comprises a component having general structure represented by following:

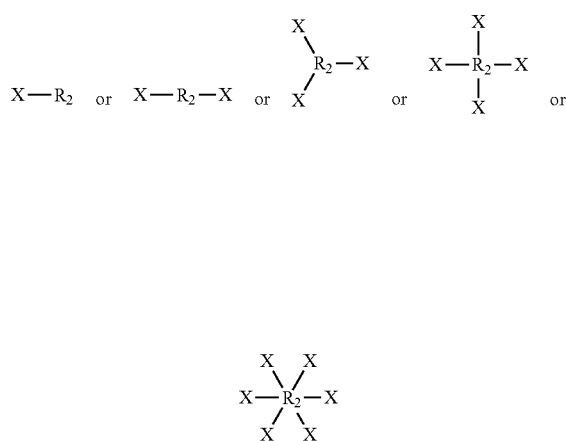

Wherein X is represented by Formula

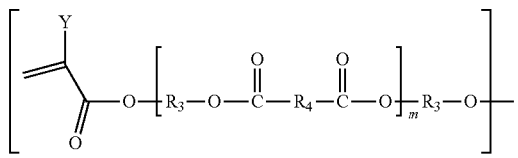

$Y = H$ or $CH_3$ m is an integer from 0 to 20, preferably from 1 to 10;
$R_3$ is represented by the following structure:

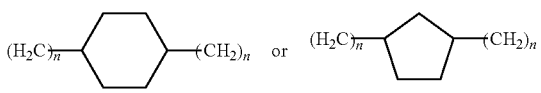

n is an integer between 0 to 20, preferably 1-4;

$R_4$ is represented by the following structure:

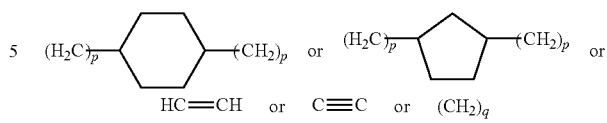

p is an integer between 0 to 20, preferably 1-4;
q is an integer between 0 to 34
$R_2$ is represented by the following structure:

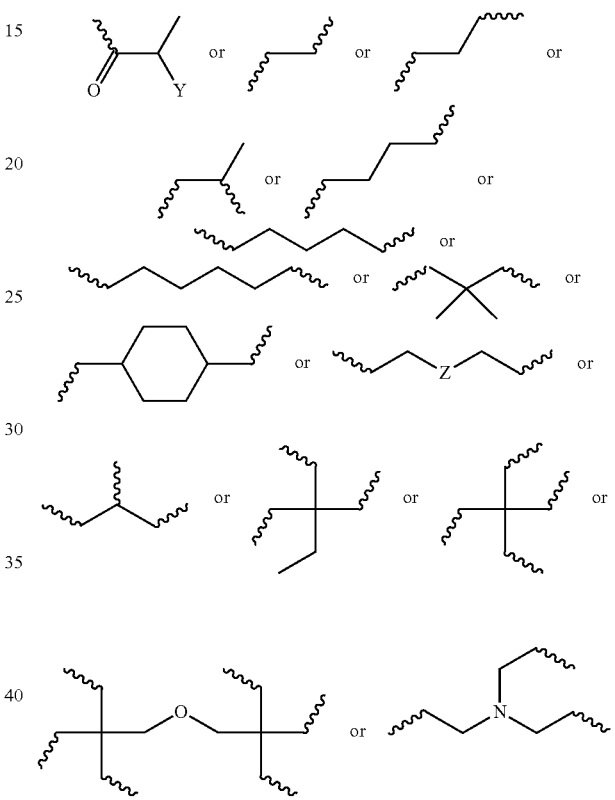

wherein $Z = O$, S, NH, N-methyl, N-ethyl, N-propyl, N-isopropyl

The wavy line symbol "∿∿" of $R_2$ indicates a bond linked directly or indirectly to X. Optionally, X is linked directly to $R_2$. Optionally, X is connected indirectly to $R_2$. The term "indirectly" in this context shall mean there is at least one additional carbon between X and $R_2$.

In one embodiment, the monomer B comprises a component represented by following structure:

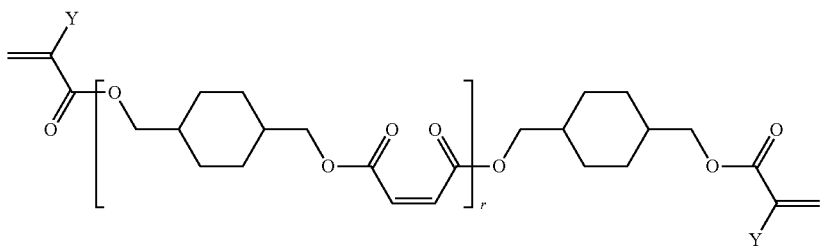

wherein,
r is an integer between 0 to 20, preferably 1 to 10;
Y=H or $CH_3$

In another embodiment, the monomer B comprises a component represented by following structure:

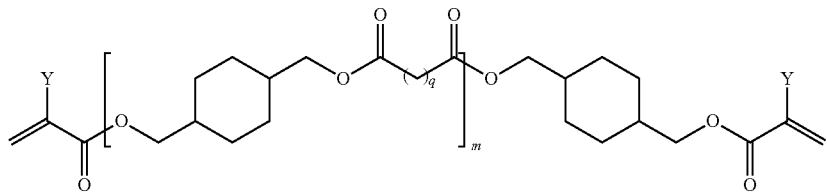

m is an integer between 0 to 20, preferably between 1-10
q is an integer between 0 to 34; preferably between 1-4
Y=H or $CH_3$ In one embodiment, the present invention provides a coating composition comprising an adduct formed by chemical reaction of PETMA and monomer B as represented by following structure:

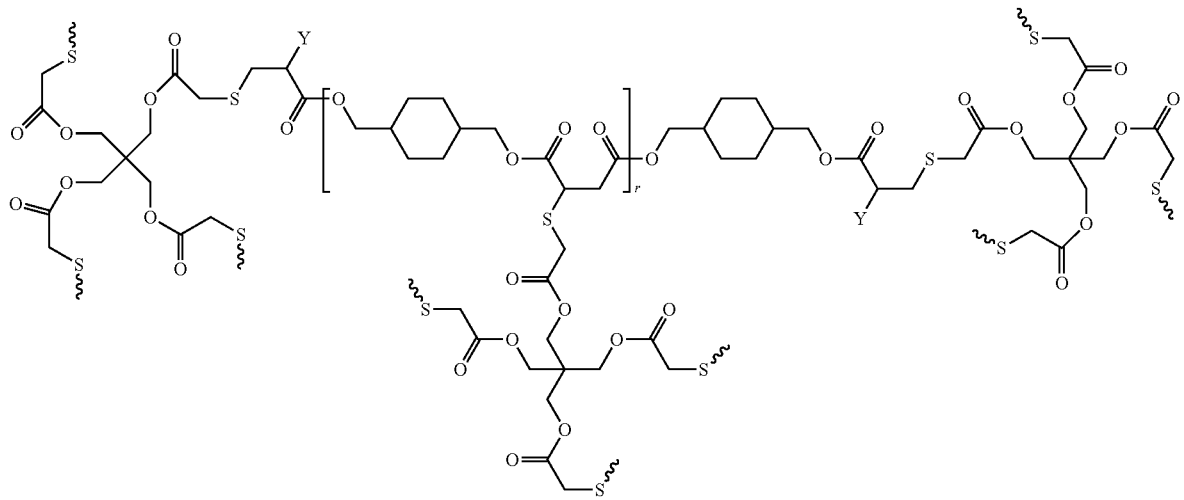

wherein,
r is an integer between 0 to 20, optionally 1 to 10
Y=H or CH3

The wavy line symbol "〰" indicates a bond formed between a mercaptoacetate group in PETMA and an unsaturation in monomer B.

In another embodiment, the present invention provides a coating composition comprising an adduct formed by chemical reaction of PETMA and monomer B as represented by following structure:

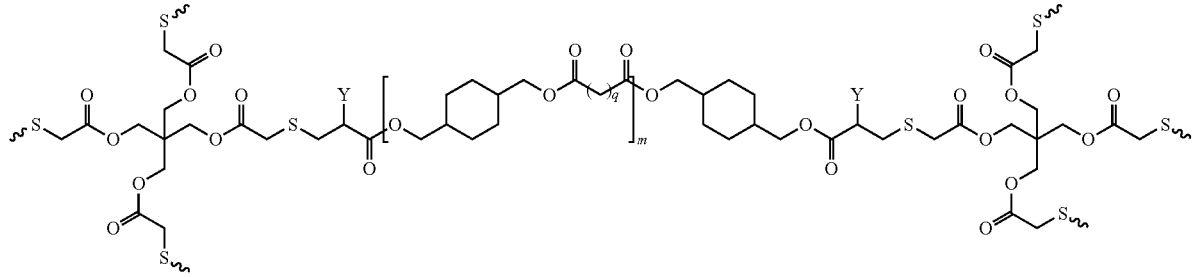

m is an integer between 0 to 20; optionally between 1-10.
q is an integer between 0 to 34; optionally between 1 to 4,
Y=H or CH$_3$ The wavy line symbol "∼∼∼" indicates a bond formed between a mercaptoacetate group in PETMA and an unsaturation in monomer B.

In one embodiment, the mercaptoalkanoate groups in monomer A and the unsaturated groups in monomer B are present in a molar ratio of between 0.5:1.5-1.5:0.5, preferably between 0.9:1.1-1.1:0.9, like for example about 1:1. In case not stoichiometric, an excess unsaturated groups is preferred, like for example 0.9:1.1.

Preferably, the monomer B of the present invention comprises a component having general structure represented by following:

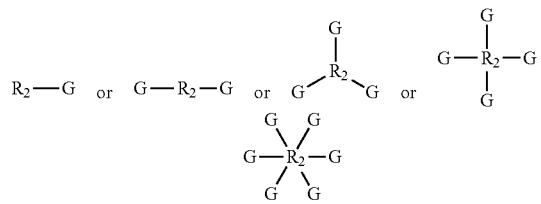

Wherein G is represented by Formula:

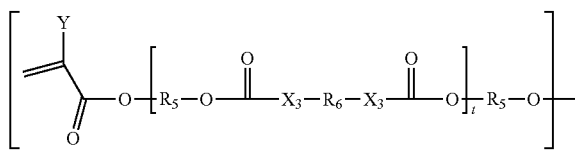

Y=H or CH$_3$;
R$_5$ is

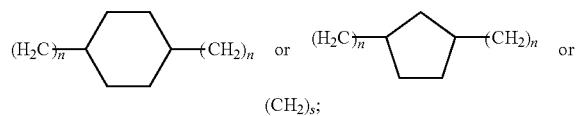

n is an integer between 0 to 20;
s is an integer between 2 to 36;
t is an integer between 0 to 20; optionally between 1-10;
X$_3$=O, NH, S, CH$_2$;
R$_6$ is represented by the following structure:

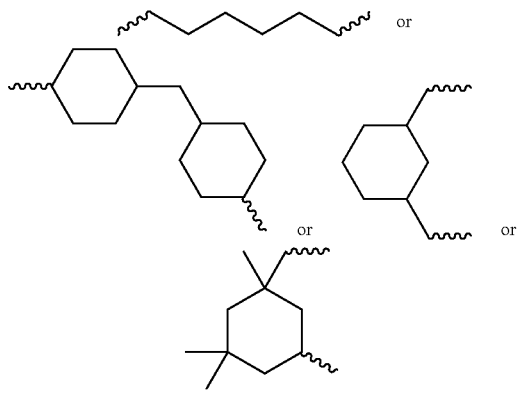

The wavy line symbol "∼∼∼" of R$_6$ indicates a bond formed between R$_6$ and X$_3$.

R$_2$ is represented by the following structure:

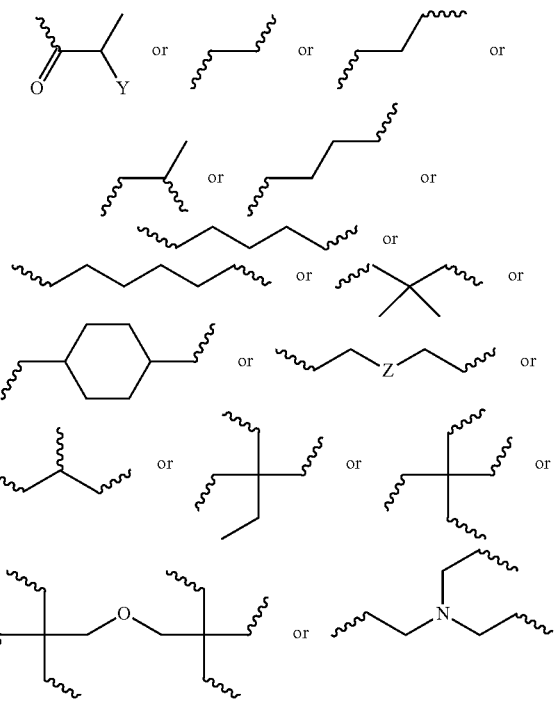

wherein Z=O, S, NH, N-methyl, N-ethyl, N-propyl, N-isopropyl

The wavy line symbol "∼∼∼" of R$_2$ indicates a bond linked directly or indirectly to G. Optionally, G is linked directly to R$_2$. Optionally, G is connected indirectly to R$_2$. The term "indirectly" in this context shall mean there is at least one additional carbon between G and R$_2$.

Preferably, the adduct of present invention is formed by chemical reaction of the monomer A comprising a component selected from a group consisting of GDMA, TMPTMA, PETMA, PETMP, TMPTMP, GDMP and any combination thereof with the monomer B. For example, the adduct is formed by reaction of the monomer A comprising PETMA and the monomer B according to any of the embodiments of the present invention.

Preferably, the monomer B include a mixture of monomer species. For example, the monomer B includes a mixture of a monomer B comprising a 5- or 6-membered cycloalkyl moiety and another monomer B species free of a 5- or 6-membered cycloalkyl moiety, i.e. the monomer B can be a mixture of two or more monomers B having the same or different substituents as defined above.

The composition for preparing the coating comprising monomer A and monomer B, may comprise further unsaturated compounds, generally having one to 5 unsaturated groups, and a molecular weight of about 100-2000 g/mole, preferably 150-1000 g/mole. This additional monomer may act as plasticizer, lowering the melting point of one of the monomers.

Examples of further monomers include unsaturated or modified unsaturated vegetable oils (e.g. soybean oil, linseed oil, castor oil, olive oil, peanut oil, safflower oil, fish oil, tung oil, cotton seed oil, canola oil, rapeseed oil, sunflower oil etc.), alkenes and polyenes, alkynes and polyynes, linear or branched alkyl-di, -tri or -tetra-(meth)acrylates, cycloalkyl-di, -tri or -tetra-(meth)acrylates, linear or branched alkylene oxide-di, -tri or -tetra(meth)acrylates, dialkyl acetylenedicarboxylates, castor oil modified with one, two, three or more (meth)acrylate groups, castor oil modified with one, two,three or more vinyl or allyl groups, aliphatic polyesters with 2 or more (meth)acrylate, vinylic or allylic groups, -aliphatic copolyesters with 2 or more (meth)acrylate, vinylic or allylic groups, aliphatic polyethers with 2 or more (meth)acrylate, vinyl- or allyl groups, polyesters containing unsaturated monomers such as maleic acid, fumaric acid, citraconic acid, itaconic acid, acetylenic acid, optionally modified with acetate, propanoate, butanoate, pentanoate, hexanoate, octanoate, decanoate, 1-undecenoate, dodecanoate, tetradecanoate, oleate, palmitate, stearate, behenate, (meth)acrylate, vinyl- or allyl groups In another aspect of the present invention, a method of manufacturing the adduct according to any of the preceding embodiments is provided.

The term "polymerization" refers to methods for chemically reacting the monomer compounds according to any of the preceding embodiments to form polymer chains. The type of polymerization method may be selected from a wide variety of methods. Such methods include, but are not limited to, free radical polymerization methods and reaction by Michael Addition.

A "polymer" resulting from the polymerization process includes homopolymers and/or non-homopolymers. The term "non-homopolymer" refers to a polymer formed from two or more polymerizable monomers and includes essentially all polymers that are not homopolymers.

In one embodiment, the monomer A reacts with the monomer B according to any of the embodiments by radical polymerization to form a linear polymer or a crosslinked network. The term "radical polymerization" and the like signify that the monomers of present invention can be polymerized in a chemical process of radical polymerization, triggered, for example, by a thermal or photo initiator. The skilled artisan is aware of such chemical process and can routinely radically polymerize the monomers of the present invention via radical polymerization method. For example see *Thiol-Ene Click Chemistry*; Charles E. Hoyle- and Christopher N. Bowman; Angew. *Chem. Int. Ed.*, 2010, 49, 1540-1573, which is incorporated by reference in its entirety.

A "radical initiator" is a compound capable of producing radical species, thereby promoting radical reactions. A radical initiator typically possesses a bond with a low bond dissociation energy. Radical initiators are particularly useful in polymer synthesis.

The radical initiators of present invention include thermal initiators like dilauroyl peroxide, dibenzoyl peroxide, azobisisobutyronitril, tert-amyl peroxybenzoate, 4,4-azobis(4-cyanovaleric acid), 1,1'-azobis(cyclohexanecarbonitrile), 2,2-bis(tert-butylperoxy)butane, 1,1-bis(tert-butylperoxy) cyclohexane, 2,5-bis(tert-butylperoxy)-2,5-dimethylhexane, 2,5-bis(tert-butylperoxy)-2,5-dimethyl-3-hexane, bis[1-(tert-butylperoxy)-1-methylethyl]benzene , 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, 2,4-pentanedione peroxide, peracetic acid, potassium persulfate and the like.

The radical initiators of present invention also include photo initiators like 2,2-dimethoxy-2-phenyl acetophenone (DMPA), benzophenone (BP), thioxanthone (TX), camphorquinone (CQ), dibenzosuberenone, alpha-hydroxyketones, phenylglyoxylates, acylphosphine oxides, oxime esters, alpha amino ketones, benzil dimethyl ketal and the like.

The term "Michael addition" or "Michael reaction" generally refers to the nucleophilic addition of a carbanion or another nucleophile to an alpha, beta unsaturated carbonyl compound (electrophile). For example, the term refers to a thio-Michael addition in which a compound with —SH functionality adds to a carbon-carbon double bond.

Preferably, the adduct of present invention is formed in presence of a catalyst, wherein the compound A reacts with the compound B by Michael Addition to form a linear polymer or a crosslinked network. The skilled artisan is aware of Michael addition reaction and can routinely polymerize the monomers of the present invention via this method. For example see *The Thiol-Michael Addition Click Reaction: A Powerful and Widely Used Tool in Materials Chemistry*; Devatha P. Nair et al., American Chemical Society, 2013, which is incorporated by reference in its entirety.

The adduct according to any of the preceding embodiments formed by chemical reaction of the monomer A with monomer B via Michael Addition is advantageous since this avoids the risk of homopolymerization of unsaturated carbon-carbon bonds into a carbon main chain polymer, not being a polyvinyl alcohol. As it is known by persons skilled in the art, carbon main chain polymers are difficult to biodegrade, with the exception of polyvinylalcohol. In addition the Michael addition avoids the risk of formation of disulfide bonds which are known to be difficult to biodegrade under oxidative conditions as known by the skilled artisan. Optionally, the Michael Addition reaction occurs in presence of a catalyst. Optionally, the catalysts include any of the following: 1,5-diazabicyclo(4.3.0)non-5-ene, triethylamine, diethylamine, ethylamine, 1,8-diazabicyclo(5.4.0) undec-7-ene, 1-pentylamine, 1-hexylamine, N,N-diisopropylethylamine, N,N-dimethylisopropylamine, 4-(dimethylamino)pyridine, imidazole, dimethyl(phenyl) phosphine, tris(2-carboxyethyl)phosphine.

In another aspect of the present invention, a coated agrochemical composition is provided.

As used herein, the term "agrochemical composition" includes biologically active ingredients or plant protection products comprising insecticides, herbicides, fertilizers, growth regulators, pheromones, biostimulants, acaricides, miticides, nematocides, fungicides and the like. They are commonly used for controlling pests and diseases and for promoting plant growth in agriculture.

As used herein, the temi "coated agrochemical composition" and the like refers to an agrochemical composition that is encapsulated, by covering it with the coating composition according to any embodiment of the present invention, in order to reduce the release rate of its ingredients or material such as fertilizers when in contact with moisture or water, i.e. in order to exhibit controlled rate of release.

In one embodiment the biologically active ingredients or plant protection products may only become active after substantial biodegradation of the coating.

The coated agrochemical compositions of present invention can have various shaped formulations such as granular, tablet, or other forms used for targeting the application of coated agrochemical composition such as plant growth nutrients to plants in a defined area. Preferably, the coated agrochemical compositions of present invention can be a mixture of the same or different formulations.

Preferably, the invention is applied on granular products of fertilizers.

In one embodiment, the coated agrochemical composition comprises a material encapsulated with a coating composition, wherein the coating composition comprises an adduct formed by chemical reaction of monomer A comprising a component having at least two mercaptoalkanoate groups with monomer B comprising a component having one or more ester moieties, and an unsaturated carbon-carbon bond. The coating composition encapsulating the material has a thickness and formulation sufficient to act as a controlled release protective layer and to have the biodegradability behavior according to the present invention.

In one embodiment, the coated agrochemical composition comprises a material encapsulated with a coating composition, wherein the coating composition comprises an adduct formed by chemical reaction of monomer A comprising a component having at least two mercaptoalkanoate groups with monomer B comprising a component having one or more ester moieties, and an unsaturated carbon-carbon bond. Optionally, the monomer B comprises a component having a) one or more ester moieties, b) a cyclopentane and/or cyclohexane moiety, and c) an unsaturated carbon-carbon bond. Optionally, the adduct is formed by reaction of the monomer A with the monomer B according to any embodiment of present invention. Optionally, the monomer A reacts with the monomer B via radical polymerization or via Michael addition.

In one embodiment, the coated agrochemical composition comprises a agricultural active material and a coating composition, where the coating composition encapsulates the agricultural active material, wherein the coating composition comprises an adduct formed by chemical reaction of monomer A comprising a component having at least two mercaptoalkanoate groups with monomer B comprising a component having an ester moiety, and an unsaturated carbon-carbon bond, wherein the coating composition and/or the coated agrochemical composition exhibits a controlled rate of release of the material over a period of 30 or more days from the date of initial exposure of the material to moisture or water, wherein at least 75 wt. % of the initial weight of the material is released from the coated agrochemical composition.

In one embodiment, the coating composition and/or the coated agrochemical composition of present invention, exhibits a controlled rate of release of the material, wherein not more than 15 wt. % of the material within the first 24 hours, and not more than 75 wt. % of the material within 28 days, and at least 75 wt. % of the material at 30 days or more is released after initial contact of the agrochemical composition with moisture or water, at temperature between 20° C. and 28° C., preferably at 25° C. (Preferably, in accordance with NEN-EN 13266), and wherein the coating composition has at least about 16% biodegradation within a time period from about 10 to 24 months, preferably, measured at ambient temperature between 20 and 28° C., preferably at 28° C. by the test methods ISO 14855, ISO 17556, ASTM D5988, UNI 11462, or NF U52-001.

Optionally, the coating composition and/or the coated agrochemical composition has about 16%, 20%, 30%, 40%, 50%, 60%, 70%, 80%, or 90% biodegradation within a time period from about 10 to 24 months, optionally, about 10 months, about 11 months, about 12 months, about 13 months, about 14 months, about 15 months, about 16 months, about 17 months, about 18 months, about 19 months, about 20 months, about 21 months, about 22 months, about 23 months, or about 24 months, optionally obtained at temperature between 20° C. and 28° C.

In one embodiment, the agricultural active material is at least partially water soluble ensuring transport of a medium such as water to the material through the composition layer via osmosis. The "osmotic" transport of the material occurs as a result of the net movement of water through the composition into the direction of higher solute concentration which results in osmotic pressure build-up. The osmotic pressure allows controlled release of a solution out of the coated agrochemical composition and continues until all material has been released. Accordingly, once dissolved, the water dissolvable materials are transported out of the coated agrochemical composition.

As used herein, the term "soluble" refers to a material that can substantially be dissolved in a given amount of a fluid at a given temperature and has a solubility of above 2 g/L. In one embodiment, the fluid of present invention is selected from a group comprising water or any liquid solvent capable of substantially dissolving the material.

Exemplary of suitable materials for use herein are fertilizers such as ammonium sulfate, potassium nitrate, potassium sulfate, urea, ammonium nitrate, monopotassium sulfate, ammonium phosphate, super-phosphate, calcium phosphates, potassium phosphate, potassium chloride, magnesium oxide, magnesium sulfate, dolomite and the like or any fertilizers obtained from compounding a mixture of these fertilizers. Optionally, the material of present invention comprises a variety of well known, standard NPK or other fertilizer granules such as those described in European Community Regulation (EC) No. 2003/2003. Alternatively, the material may be a water-soluble salt or other such material, e.g. sodium-salts or calcium-salts. Also, non-active materials such as sugar and other granular materials may be employed as the core material herein, if desired.

In one embodiment, the material comprises at least one secondary nutrient and/or micronutrient. Suitable secondary nutrients include calcium, magnesium, sulfur, sodium and mixtures thereof. Suitable micronutrients, in chelated or non-chelated form, include iron, copper, zinc, manganese, boron, cobalt, chlorine, molybdenum and mixtures thereof.

In one embodiment, the material comprises one or more nitrification, denitrification inhibitors, urease inhibitors, biostimulants, herbicides, insecticides, fungicides, plant growth regulators, pheromones, animal repellents, insect repellents or mixtures thereof.

Generally, the materials have a solubility of about 2 to about 1200 g/L, preferably, about 120-450 g/L. Optionally, the material is shaped as a granule having a diameter of about 0.35 to about 6 mm, preferably, about 0.72-4 mm for better distribution of the product.

As used herein, the term "solubility" refers to the maximum amount of a material of present invention that can be dissolved in a given quantity of fluid such as water at a given temperature. For example, the measure of solubility of a material at a given temperature is how many grams dissolve in 1 liter of fluid to form a saturated solution.

The coating composition according to any of the embodiment, may be applied to the material (e.g. granular fertilizer) by a number of methods. For example, in one embodiment, the coating process is performed in either a pugmill, a coating drum or a fluidized bed, such as in the Wurster process.

The (overall) thickness of the coating(s) applied on material such as the fertilizer granules is generally between about 5 and 110 μm; and preferably, between about 25 and 90 μm. Typically, these values correspond to an amount of coating material applied of about 1 to about 20 parts per hundred (pph) by weight and about 4 to about 15 pph by weight, respectively.

In another embodiment, a process for preparing the coated agrochemical composition is provided. Said process comprises: a) providing a material, optionally, the material comprises at least one water soluble fertiliser compound, b) coating the material with the coating composition according to any embodiment of the present invention, preferably, such that the material is coated with a layer of the coating composition which forms a uniform, substantially continuous polymer film on the core material and optionally, with at least about 90% of all the material (e.g. granular fertilizer) being coated with the film; wherein the coating composition and/or the agrochemical composition exhibits controlled release of the material and is biodegradable according to the defined criteria of the present invention.

In one embodiment, the present invention provides a coated agrochemical product comprising two or more coated agrochemical compositions (e.g. coated granular fertilizer composition) according to any of the preceding embodiments and a thermoplastic polymeric binding agent comprising C1-C4-polyalkylene oxide with a melt temperature in the range of about 50° C. to about 160° C.; wherein the coated agrochemical composition are held together (bonded) by the binding agent in a mechanically stable, shaped controlled release product, said shaped controlled release product is dispersed into separate granules after contact with water.

In one embodiment, the C1-C4-polyalkylene oxide is a C1-C4-homopolymer, C1-C4-polyalkylene oxide block co-polymer or terpolymer, or polyolefin-C1-C4-polyalkylene oxide block co-polymer.

Optionally, the product comprises about 0.1 to 40 weight percent binding agent. Optionally, the binding agent has a melt temperature in the range of about 50° C. to 100° C.

In one embodiment, the binding agent includes polyethylene oxide homopolymers, polyethylene oxide-block-polypropylene oxide copolymers, polyethylene oxide-block-polypropylene oxide-block-polyethylene oxide terpolymers, polypropylene oxide-block-polyethylene oxide-block-polypropylene oxide terpolymers, polyethylene-block-polyethylene oxide copolymers, polyethylene-block-polypropylene oxide copolymers, polypropylene-block-polyethylene oxide copolymers, polypropylene-block-polypropylene oxide copolymers or mixtures thereof. The block copolymers have the additional advantage over the homopolymers of exhibiting wetting properties, which enhance the rate of water absorption in the soil.

In one embodiment, at least one other component is mixed with the coated agrochemical composition (e.g. coated fertilizer granules) and the binding agent, the other component including water-absorbent gels, nitrification inhibitors, urease inhibitors, herbicides, insecticides, fungicides, pheromones, animal repellents, insect repellents or mixtures thereof.

The shaped nutrient product of present invention can be prepared via various methods. For example, the method comprises: providing coated agrochemical compositions (e.g. coated granules fertilizers) according to any of the embodiments of present invention; preheating the agrochemical compositions to a temperature in the range of about 50-100° C.; mixing said agrochemical compositions with a theiiiioplastic polymeric binding agent comprising C1-C4-polyalkylene oxide with a melt temperature in the range of about 50° C. to about 160° C. which has been heated to form a melt, wherein the mixture comprises about 0.1 to 40 weight percent binding agent; and introducing the mixture into a mold and cooling the mixture in the mold to form the shaped plant growth nutrient product, wherein the coated plant growth nutrient granules are held together by the binding agent in a mechanically stable, shaped controlled release plant growth nutrient product, said shaped biodegradable and controlled release plant growth nutrient product is dispersed rapidly into separate granules after contact with water as described in U.S. Pat. No. 8,399,020B2.

The monomers A and B of present invention are either commercially available or can routinely be produced by a person skilled in the art. The following examples will serve to further illustrate the invention, but are not meant to limit it thereto.

EXAMPLES

General Description Process of Coating Fertilizer Granules

Fertilizer granules are heated in a rotating drum coater to 50-100° C. The temperature is chosen such that the monomers are liquid. When the desired temperature is reached, monomer A (thiol) is added with a syringe to the granule bed after which it is rotated for about 2 minutes to allow homogeneous distribution of monomer A over the granules. Then monomer B (ene) including the catalyst is added in an equimolar amount. Within 3-4 minutes the sulfide containing polyester coating layer is formed. The addition of the two monomers is continued until the desired coating thickness is obtained.

Examples 1 and 2

Coated Fertilizer Granules Using Polyester-Acrylate 1 and PETMA

First a polyester acrylate was prepared from a commercial polyester diol.

The Polyester-diol-1 (monomer B) is a polyester of 1,4-cyclohexanedimethanol and a mixture of adipic acid (q=4), glutaric acid (q=3) and succinic acid (q=2) as represented by the following structure:

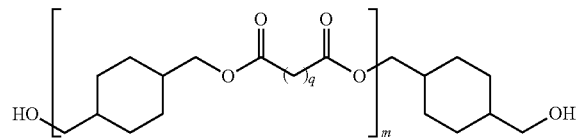

Polyester-diol-1 has terminal hydroxyl groups and is commercially available under the trade name of K-Pol 8211 and supplied by King Industries Ltd. The subscript m varies in a way that the average molecular weight of K-Pol 8211 is 280 g/mole.

Preparation of Polyester-Acrylate 1

The Polyester-Acrylate-1 was prepared by reacting Polyester-diol-1 with acryloyl chloride according to the following procedure: Polyester-diol-1 (50 gram, 0.1785 mole) was charged into a 1000 mL 3 neck-flask and diluted with chloroform (300 mL) and subsequently triethylamine (45 grams, 0,446 mole) was added to the solution. Acryloyl chloride (35.5 grams, 0.3928 mole) was charged into a dropping funnel and diluted with chloroform (10 mL). The flask was cooled to 0° C. with an ice bath and stirred under a nitrogen atmosphere. The acryloyl chloride solution was added dropwise to the stirred polyester-diol-1 solution at 0° C. After addition of the acryloyl chloride solution the mixture was allowed to reach room temperature while it was stirred overnight. The resulting suspension was filtered through a paper filter and the filtrate was concentrated in vacuo to a volume of 150 mL in a rotary evaporator. The concentrate was added dropwise into 600 mL heptane under stirring in a beaker in order to precipitate the brown impurities. The heptane solution containing the polyester acrylate 1 was filtered through a pore 3 glass filter under reduced pressure. The precipitate was washed with 25 mL heptane and the filtrate was concentrated in vacuo. The filtrate was dissolved in 200 mL chloroform and transferred to a separatory funnel. The organic layer was washed 1× with brine (250 mL), 1× with 1 M HCl (250 mL) and 1× with 1 M NaOH (250 mL). The organic layer was dried with anhydrous sodium sulfate and subsequently filtered and dried in vacuo. A yellowish oil was obtained which partly crystallized into a white solid.

Coating of Fertilizer Granules

The Polyester-acrylate-1 was heated to about 50° C. on a hotplate until it was fluid, after which it remained fluid during the preparation of the batch. Pentaerythritol tetrakis (2-mercaptoacetate) (PETMA) was melted on a hot plate at about 50° C. Catalyst 1,5-diazabicyclo[4.3.0]non-5-ene (DBN) was dissolved in dichloromethane to a concentration of 4.0 M. For a batch of 750 g fertilizer granules, 6.7 g PETMA and an equimolar amount of 12.0 g Polyester-Acrylate-1 was used for each coating layer. A batch of 750 g fertilizer granules was heated in a rotating drum coater to 80° C. With a syringe the PETMA was added to the granule bed after which the granule bed was rotated for about 2 minutes to allow homogeneous distribution over the granules. The 4.0 M DBN catalyst solution was mixed with the polyester-acrylate 1. Then the Polyester-Acrylate-1/DBN mixture was added. The DBN catalyst dosing was decreased from the first coating layer to subsequent layers: 1$^{st}$ layer: 635 μl 4.0 M DBN (15 mg/g coating), layers 2-8: 190 μl 4.0 M DBN catalyst (4.5 mg/g coating). Within 3-4 minutes a sulfide containing polyester coating layer was formed and the granule bed, which was somewhat sticky during the process, became free flowing again. The addition of the two monomers was continued until the desired coating thickness of about 100 μtm was obtained. The granules were post-cured for 15 minutes and then cooled to room temperature Nutrient Leaching Test of Coated Fertilizer Granules Determining Controlled Release Properties For the water-leach test, a 20 g sample of coated fertilizer is placed in 400 mL of demineralized water (conductivity <0.03 mS/cm) at 21° C. At certain time intervals the electrical conductivity of the supernatant solution is measured and the water is replaced by fresh water. Based on the measured conductivity the concentration of nutrients is calculated.

A set of two test samples of coated fertilizer granules was prepared according to the procedure described in the example, using Polyester-Acrylate-1 and PETMA. The coating amount of the first sample was 15 parts per hundred (pph) in weight (example 1) and for the second sample 20 pph (example 2). These samples were analyzed according to the water-leach test at 21° C. and the cumulative release of nutrients is given in FIG. 1 showing that for the Polyester-Acrylate-1/PETMA coated fertilizer granules after 60 days, the 15 pph-sample has released 90% of the nutrients, whereas the 20 pph-sample has released about 80% of the nutrients.

Example 3

Preparation of Free Standing Film of Coating Composition

The Polyester-acrylate-1 (2,054 g, 5,298 millimole) was heated to about 50° C. on a hotplate until it was fluid followed by the addition of 0.5 ml of 0.05 M solution of DBN in chloroform. The mixture of the polyester-acrylate-1 and catalyst solution was stirred for a minute for a homogeneous distribution of the catalyst in the monomer. Then PETMA (1,144 g, 2,649 millimole) which had been preliminary melted at 50° C. was added to the polyester-acrylate-1 and the monomer mixture was stirred for 1 minute at ambient temperature. The final mixture was split into two parts by transferring half of it into a different cup. Both cups were transferred to a hotplate and kept there for 1 hour at 80° C.

Hydrolysis of Coating Film: First Step in Biodegradation

Figure 2A:
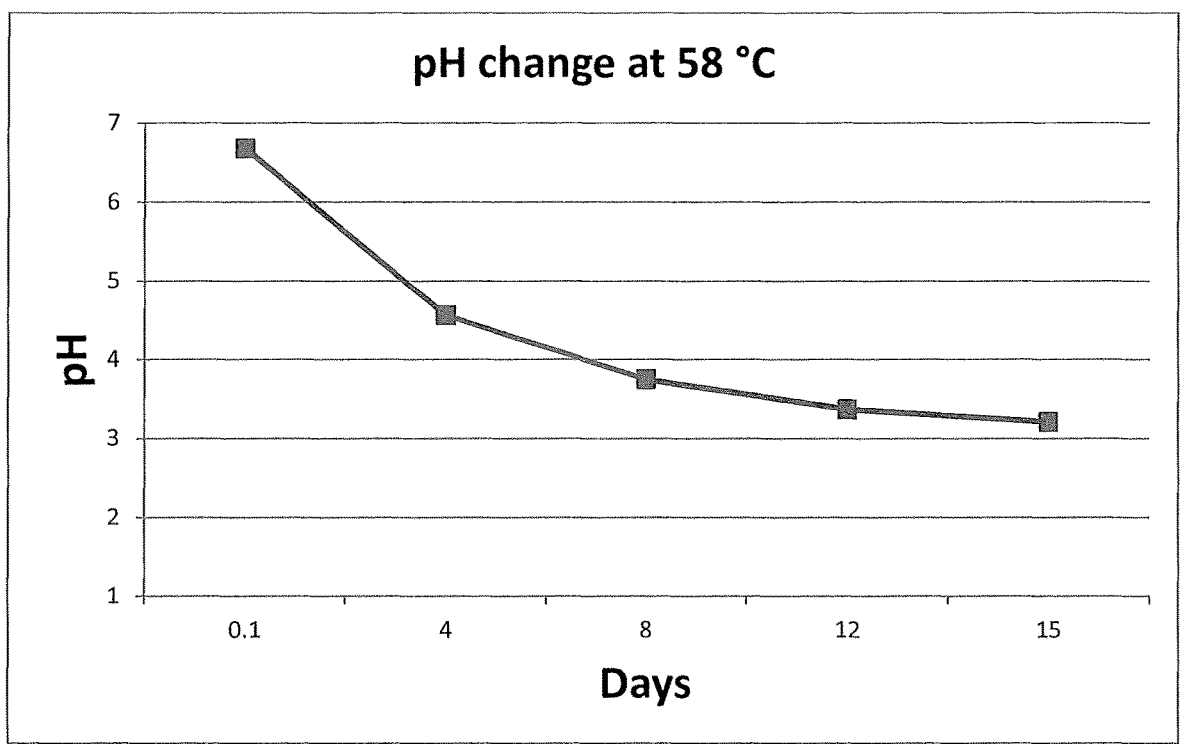
FIG. 2a shows change of pH over time of a polymer film as used in the product for FIG. 1. The polymer film is immersed in water at 58° C., the pH of the surrounding water is measured at regular intervals during 15 days.
Figure 2B:
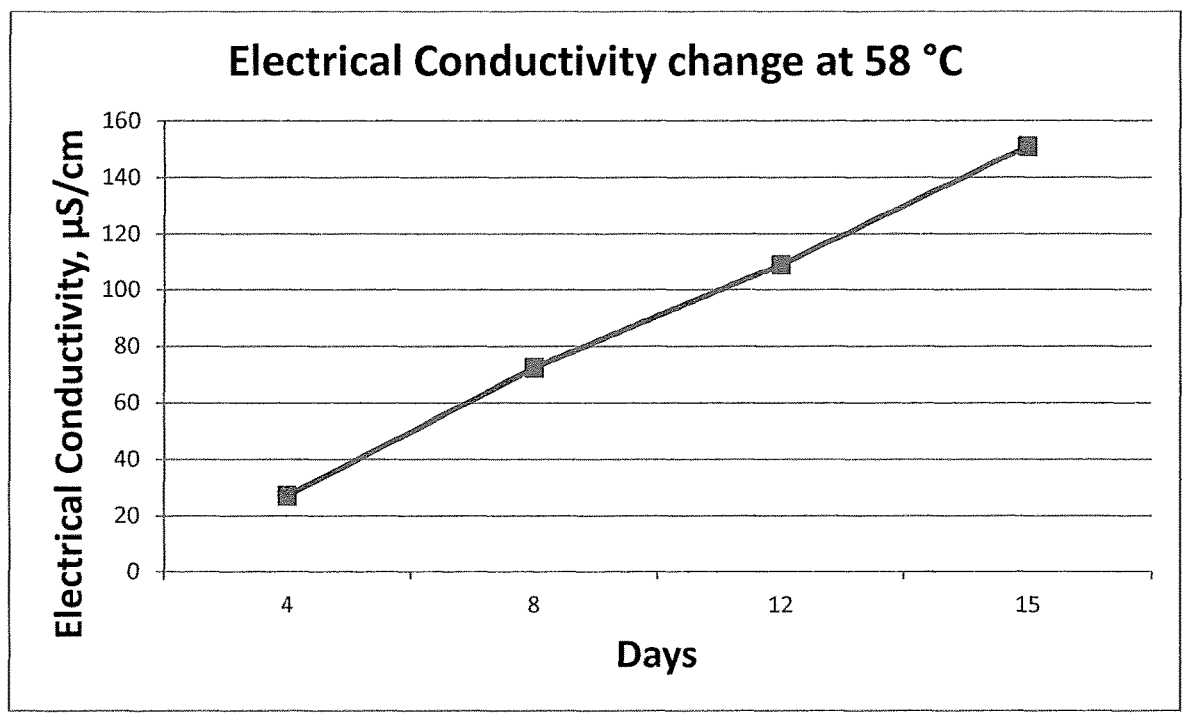
FIG. 2b shows change in electrical conductivity over time. The polymer film is immersed in water at 58° C., the electrical conductivity of the surrounding water is measured at regular intervals during 15 days.

Polymer films of coating composition were prepared according to above example, based on Polyester-Acrylate-1 and PETMA. To examine the hydrolysis rate of the coating films, the polymer film was immersed in water at 58° C. and the electrical conductivity and pH of the surrounding water were measured at regular intervals during 15 days. FIG. 2a shows the change of pH and FIG. 2b shows the change in electrical conductivity. Due to hydrolysis the pH drops and the electrical conductivity increases, as can be seen from FIGS. 2a and 2b. Note that hydrolysis is auto catalyzed by the released acids, so the hydrolysis accelerates in time. After two months in water the films were completely disintegrated.

Biodegradability of Coating Composition

Figure 3:
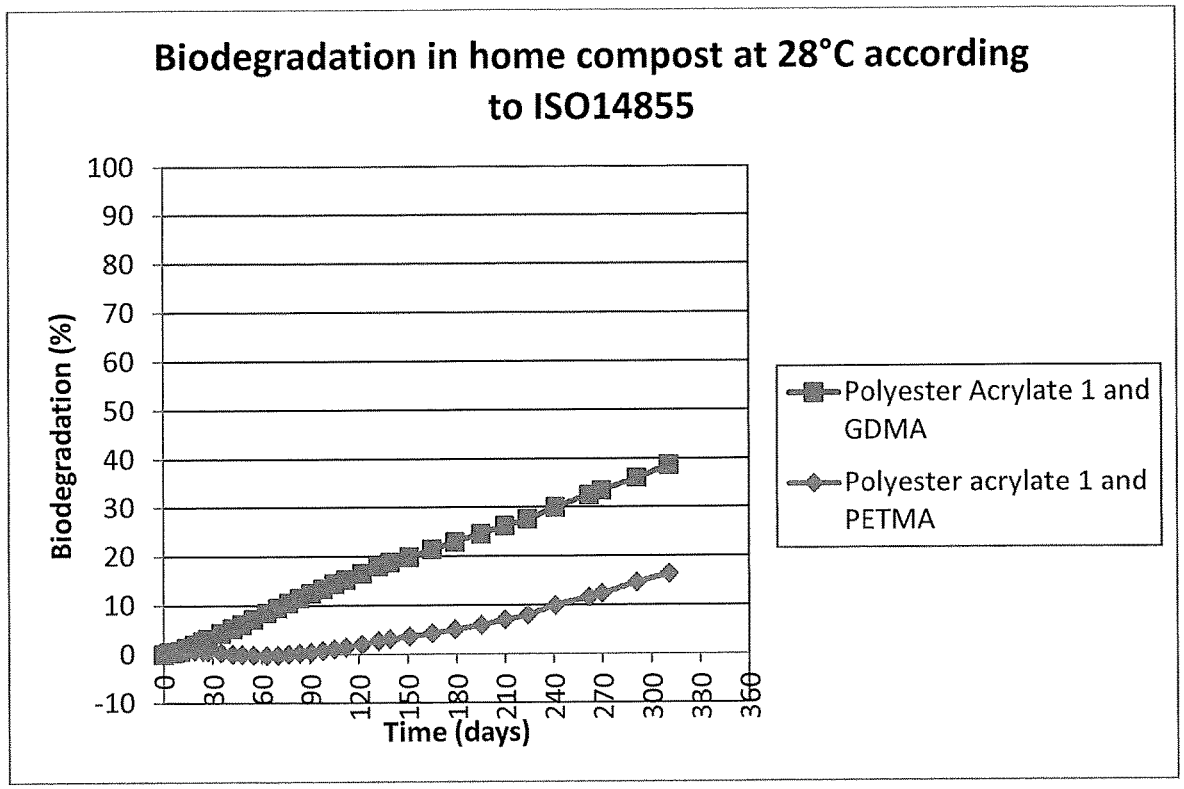
FIG. 3 shows the biodegradation curve of the reaction product of ethylene glycol bis(2-mercaptoacetate) (GDMA) and Polyester-Acrylate-1, a polymer according to the present invention, and of the reaction product of pentaerythritol tetrakis (2-mercaptoacetate) (PETMA) and Polyester-Acrylate-1, a coating according the present invention. The biodegradation is measured in home compost at 28° C. according to ISO 14855.

Polymer films of coating composition were prepared according to above example 3, based on Polyester-Acrylate-1 and PETMA respectively based on Polyester Acrylate-1 and GDMA. Biodegradation was tested at 28° C. under home composting conditions according to ISO 14855. The percentage of biodegradation is given by the ratio of the amount carbon dioxide produced by the test material to the maximum theoretical amount of carbon dioxide that can be produced from the test material. FIG. 3 shows the linear progression of biodegradation of both samples. For comparison, biodegradation of a standard alkyd-coating was tested in soil at 20° C. and at 25° C. according to ISO 17556 as well as under industrial composting conditions at 58° C. according to ISO 14855. The results (Table 2) show clearly improved biodegradation for the coating composition of present invention compared to the standard alkyd coating.

TABLE 2

BIODEGRADATION OF COATING COMPOSITIONS

| Sample identity | Test conditions | Test method | Test duration (days) | Biodegradation (%) |
| --- | --- | --- | --- | --- |
| Polyester-Acrylate-1 and PETMA thiol-ene adduct | Home composting, 28° C.; CO2-release | ISO 14855 | 311 | 16.3%* |
| Polyester-Acrylate-1 and GDMA thiol-ene adduct | Home composting, 28° C.; CO2-release | ISO 14855 | 311 | 40.4%* |
| Standard alkyd | Soil, 20° C.; CO2-release | ISO 17556 | 270 | 1.9%** |
| Standard alkyd | Soil, 25° C.; CO2-release | ISO 17556 | 510 | 5.6%** |

TABLE 2-continued

BIODEGRADATION OF COATING COMPOSITIONS

| Sample identity | Test conditions | Test method | Test duration (days) | Biodegradation (%) |
|---|---|---|---|---|
| Standard alkyd | Industrial composting, 58° C.; CO2-release | ISO 14855 | 124 | 6.3%** |

*Biodegradation progresses linearly
**Biodegradation levels off to the indicated value

OTHER EMBODIMENTS

The detailed description set-forth above is provided to aid those skilled in the art in practicing the present invention. However, the invention described and claimed herein is not to be limited in scope by the specific embodiments herein disclosed because these embodiments are intended as illustration of several aspects of the invention. The embodiments set-forth above can be performed and combined with other disclosed embodiments according to the invention. Any equivalent embodiments are intended to be within the scope of this invention. Indeed, various modifications of the invention in addition to those shown and described herein will become apparent to those skilled in the art from the foregoing descriptions which do not depart from the spirit or scope of the present inventive discovery. Such modifications are also intended to fall within the scope of the appended claims. All publications, patents, patent applications and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present invention.

The following numbered paragraphs set out particular combinations of features which are considered relevant to particular embodiments of the present disclosure.

1) A coated agrochemical composition comprising an agricultural active material encapsulated with a coating composition, wherein the coating composition comprises an adduct formed by chemical reaction of monomer A comprising a component having at least two mercaptoalkanoate groups with monomer B comprising a component having an ester moiety and an unsaturated carbon-carbon bond.
2) The coated agrochemical composition according to any of the paragraphs, wherein the coating composition exhibits a controlled rate of release of the material at 30 days or more from the date of initial exposure of the material to moisture or water, wherein greater than 75 wt % of the initial weight of the material is released from the coated agrochemical composition.
3) The coated agrochemical composition according to any of the paragraphs, wherein the coating composition has at least about 16% biodegradation within a time period from about 10 to 24 months.
4) The coated agrochemical composition according to any of the paragraphs, wherein the coating composition is adapted such that not more than 15 wt. % of the agricultural active material within the first 24 hours, and not more than 75 wt. % of said material within 28 days, and at least 75wt % of said material at 30 days or more is released after initial contact of the coated agrochemical composition with water at ambient temperature, preferably at 25° C.
5) The coated agrochemical composition according to any of the paragraphs, wherein monomer A comprises a compound having between 2 and 8 mercaptoalkanoate groups and a molecular weight between 200 and 2000 g/mole and a melting point below 60 degrees C.
6) The coated agrochemical composition according to according to any of the paragraphs, wherein the monomer A comprises a component represented by following structure:

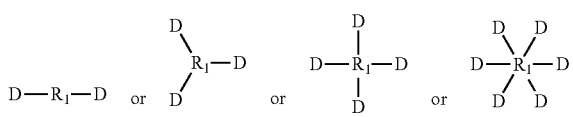

wherein,
D is represented by following structure:

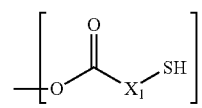

$X_1$ is a linear or branched aliphatic carbon chain ranging from 1 to 20 carbon atoms;
$R_1$ is represented by the following structure:

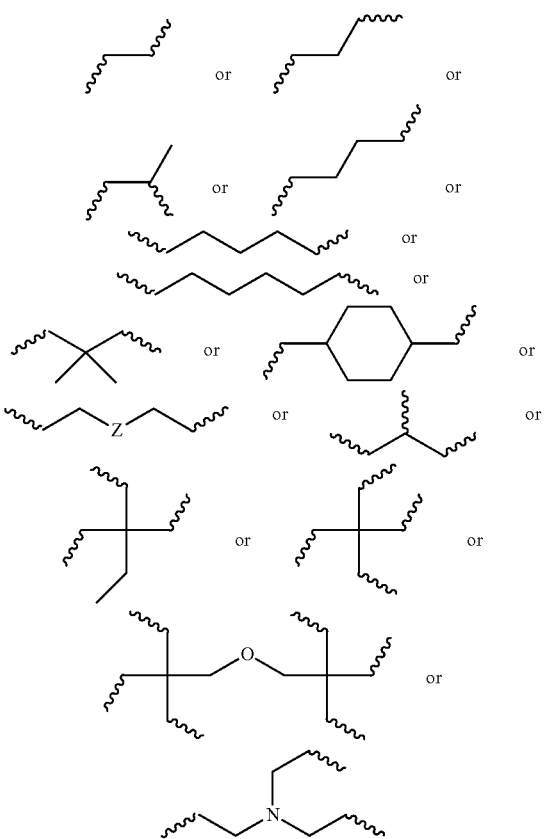

P wherein Z is selected from a group consisting of O, S, NH, N-methyl, N-ethyl, N-propyl, and N-isopropyl and wherein the wavy line symbol "∿" indicates a bond linked directly or indirectly to D. Optionally, D is linked directly to $R_1$. Optionally, D is connected indirectly to $R_1$. The term "indirectly" in this context shall mean there is at least one additional carbon between D and $R_1$.

7) The coated agrochemical composition according to any of the paragraphs, wherein the monomer A comprises a component selected from a group consisting of CDMA, TMPTMA, PETMA, PETMP, TMPTMP, GDMP and any combination thereof.

8) The coated agrochemical composition according to any of the paragraphs, wherein the monomer A comprises PETMA.

9) The coated agrochemical composition according to any of the paragraphs, wherein the monomer B comprises a component having between 2 and 50 ester groups and between 2 and 8 unsaturated carbon-carbon double bonds and having a molecular weight of between 200 and 5000 g/mole and a melting point below 60 degrees C.

10) The coated agrochemical composition according to any of the paragraphs, wherein the monomer B comprises a component represented by following structure:

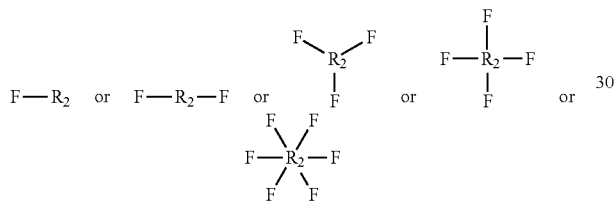

wherein,
F is represented by the following structure:

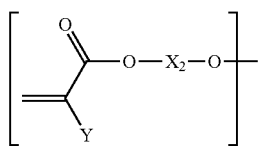

$X_2$ is a polyester,
Y is H or $CH_3$;
$R_2$ is represented by the following structure:

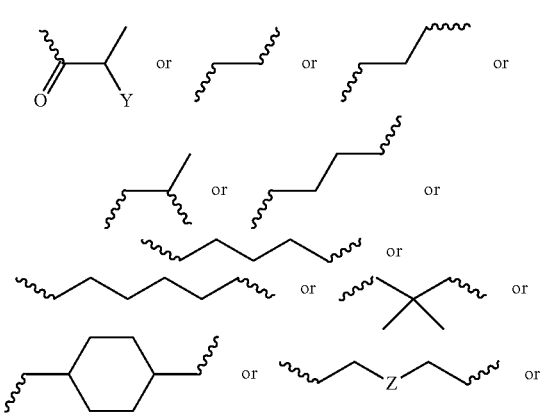

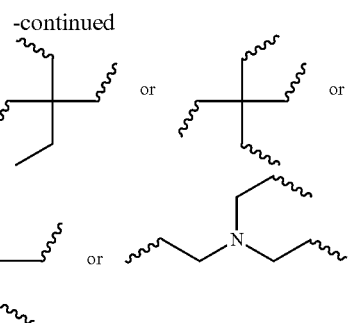

wherein Z is selected from a group consisting of O, S, NH, N-methyl, N-ethyl, N-propyl, and N-isopropyl and wherein the wavy line symbol "∿" indicates a bond linked directly or indirectly to F. Optionally, F is linked directly to $R_2$.

Optionally, F is connected indirectly to $R_2$. The term "indirectly" in this context shall mean there is at least one additional carbon between F and $R_2$.

11) The coated agrochemical composition according to any of the paragraphs, wherein the monomer B further comprises a cyclopentane and/or cyclohexane moiety.

12) The coated agrochemical composition according to any of the paragraphs, wherein the monomer B of present invention has general structure represented by following:

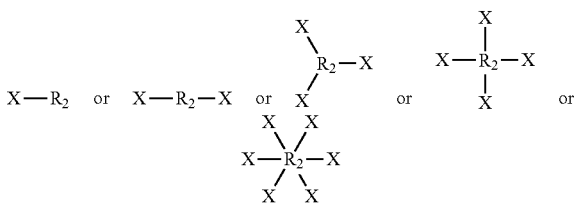

Wherein X is represented by Formula

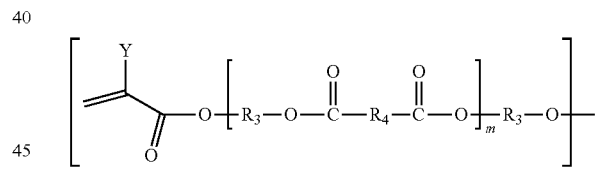

Y=H or $CH_3$
m=0 to 20, optionally 1-10;
$R_3$ is represented by the following structure:

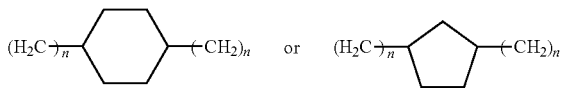

n is an integer between 0 to 20
$R_4$ is represented by the following structure:

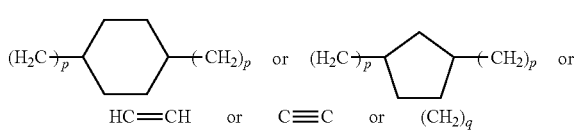

p is an integer between 0 to 20
q is an integer between 0 to 34
R₂ is represented by the following structure:

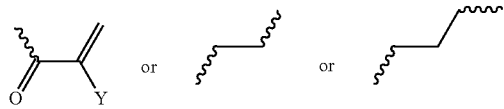

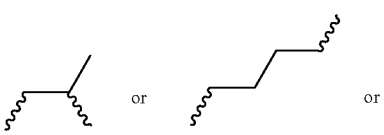

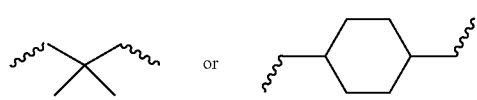

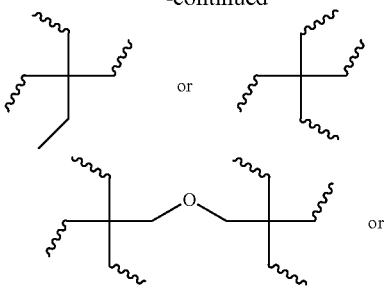

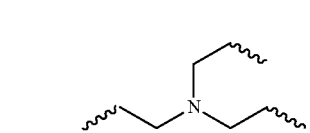

wherein Z is selected from a group consisting of O, S, NH, N-methyl, N-ethyl, N-propyl, and N-isopropyl and wherein the wavy line symbol "〰" indicates a bond linked directly or indirectly to X. Optionally, X is linked directly to R₂. Optionally, X is connected indirectly to R₂. The term "indirectly" in this context shall mean there is at least one additional carbon between X and R₂.

13) The coated agrochemical composition according to any of the paragraphs, wherein the monomer B comprises a 5- or 6-membered cycloalkyl moiety with at least two (meth)acrylate end groups or of the 5- or 6-membered cycloalkyl moieties separated by 1-9 ester bonds and has at least two acrylate or methacrylate end groups.

14) The coated agrochemical composition according to any of the paragraphs, wherein the monomer B comprises a component represented by following structure:

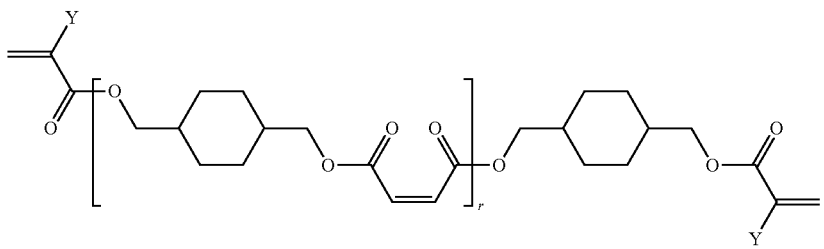

wherein,
r is an integer between 0 to 20; optionally 1 to 10;
Y is H or CH₃
and/or a component represented by following structure:

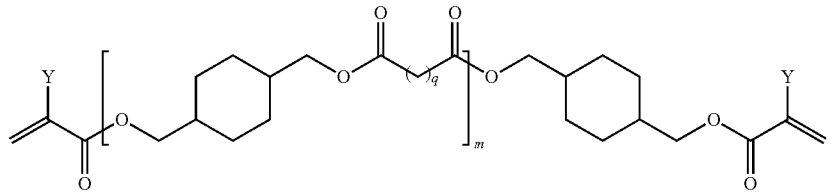

wherein
m is an integer between 0 to 20, optionally between 1-10;
q is an integer between 0 to 34; optionally between 1-4
Y=H or CH₃

15) The coated agrochemical composition according to any of the paragraphs, wherein the adduct is formed by chemical reaction of PETMA and monomer B comprising a component represented by following structure:

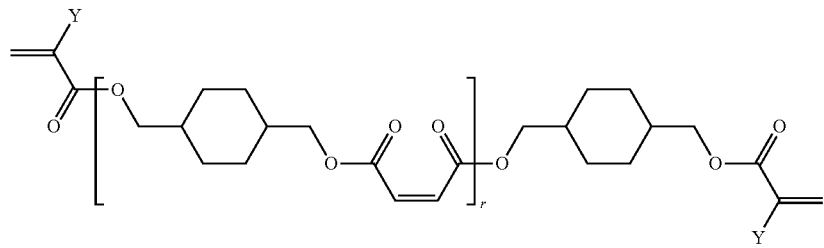

wherein,
r is an integer between 0 to 20, optionally 0 to 10;
Y is H or CH₃
and/or a component represented by following structure:

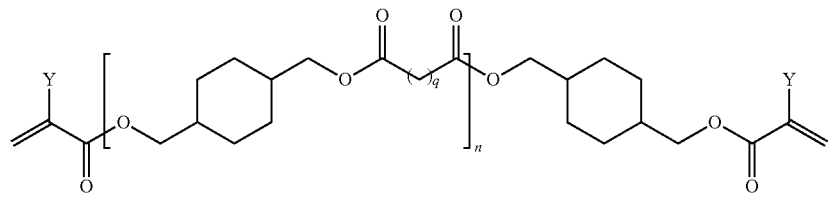

wherein
m is an integer between 0 to 20, optionally between 1-10;
q is an integer between 0 to 34; optionally between 1-4
Y=H or CH₃

16) The coated agrochemical composition according to any of the paragraphs, wherein the adduct is formed by chemical reaction of monomer A with monomer B, wherein the monomer B comprises a component having structure represented by following:

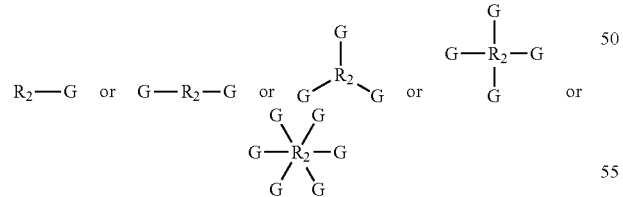

Wherein G is represented by Formula:

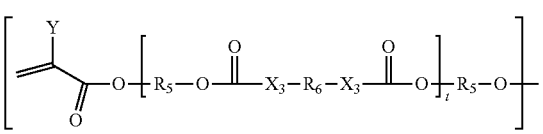

Y=H or CH₃;

R5 is

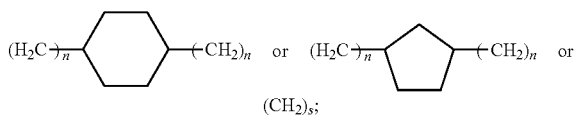

n is an integer between 0 to 20;
s is an integer between 2 to 36;
t is an integer between 0 to 20; optionally between 1-10;
X₃=O, NH, S, CH₂, R₆ is represented by the following structure:

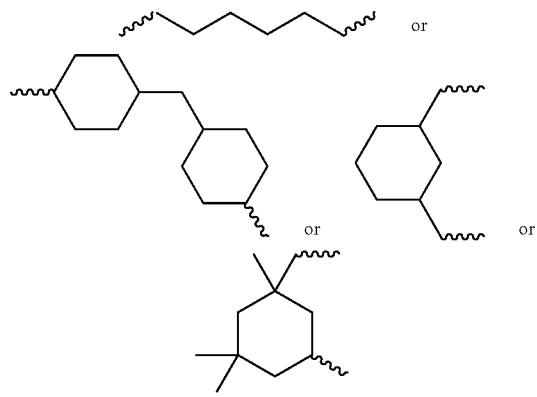

The wavy line symbol "〰" of R6 indicates a bond formed between R₆ and X₃.

R₂ is represented by the following structure:

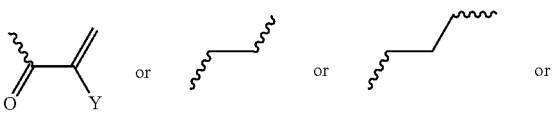

-continued

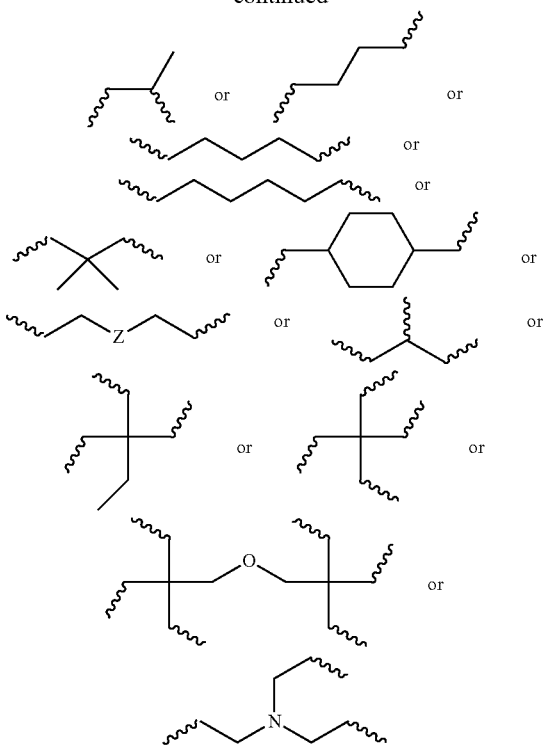

wherein Z is selected from a group consisting of O, S, NH, N-methyl, N-ethyl, N-propyl, and N-isopropyl and wherein the wavy line symbol "〰" indicates a bond linked directly or indirectly to G. Optionally, G is linked directly to $R_2$. Optionally, G is connected indirectly to $R_2$. The term "indirectly" in this context shall mean there is at least one additional carbon between G and $R_2$.

17) The coated agrochemical composition according to any of the paragraphs, wherein the core material is selected from a group consisting of fertilizers, nitrification, de-nitrification, ureas inhibitors, insecticides, herbicides, fungicides, pheromones, biostimulants, growth regulators and mixtures thereof.

What is claimed is:

1. A biodegradable controlled release agrochemical composition comprising a shaped agricultural active material that is at least partially water soluble which is encapsulated with a coating of a coating composition for controlled release of the agricultural active material,
wherein the coating composition comprises an adduct formed by chemical reaction of monomer A and monomer B,
wherein monomer A is selected from the group consisting of ethylene glycol bis(2-mercaptoacetate) (GDMA), trimethylolpropane tris(2-mercaptoacetate) (TMPTMA), pentaerythritol tetrakis(2-mercaptoacetate) (PETMA), pentaerythritol tetrakis(3-mercaptopropionate) (PETMP), trimethylolpropane tris(3-mercaptopropionate) (TMPTMP), ethylene glycol bis(3-mercaptopropionate) (GDMP) and any combination thereof,
wherein the monomer B comprises a component having between 2 and 50 ester groups and between 2 and 8 unsaturated carbon-carbon double bonds and having a molecular weight of between 200 and 5000 g/mole,
wherein the monomer B further comprises a cyclopentane and/or cyclohexane moiety, and
wherein the coating has a thickness between about 5 and 110 μm and/or wherein the amount of coating material applied is 1 to 20 parts per hundred (pph) by weight.

2. The biodegradable controlled release agrochemical composition of claim 1, wherein the coating composition exhibits a controlled rate of release of the material, wherein greater than 75 wt % of the initial weight of the material is released from the coated agrochemical composition at 30 days or more from the date of initial exposure of the material to moisture or water.

3. The biodegradable controlled release agrochemical composition according to claim 1, wherein the coating composition has at least about 16% biodegradation within a time period from about 10 to 24 months.

4. The biodegradable controlled release agrochemical composition according to claim 1, wherein the coating composition is adapted such that not more than 15 wt % of the agricultural active material within the first 24 hours, and not more than 75 wt % of said material within 28 days, and at least 75 wt % of said material at 30 days or more is released after initial contact of the coated agrochemical composition with water at ambient temperature.

5. The biodegradable controlled release agrochemical composition according to claim 1, wherein the monomer A is PETMA.

6. The biodegradable controlled release agrochemical composition according to claim 1, wherein the monomer B comprises a component represented by the following structure:

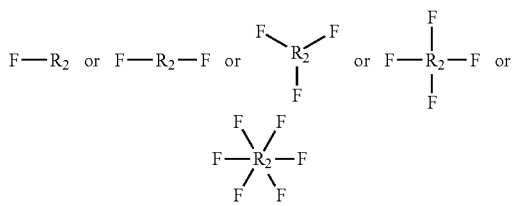

wherein,
F is represented by the following structure:

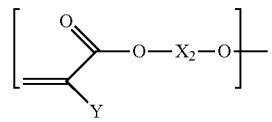

$X_2$ is a polyester,
Y is H or $CH_3$; and
$R_2$ is represented by the following structure:

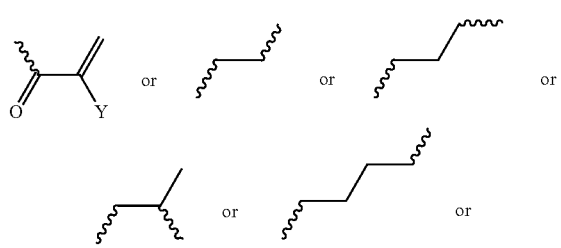

-continued

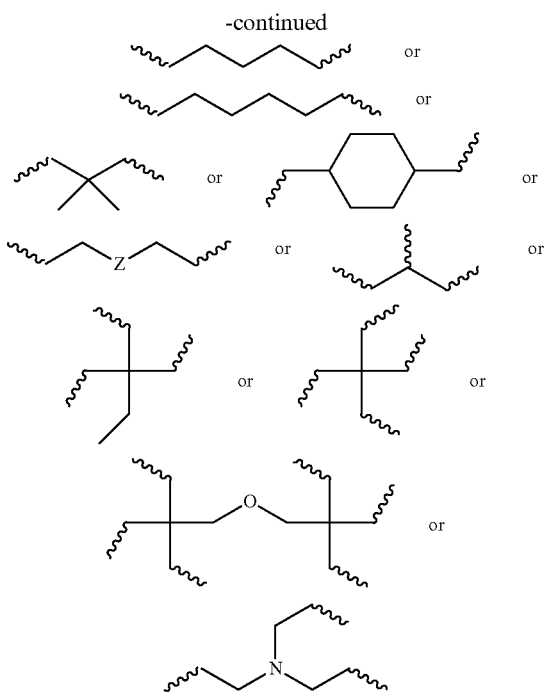

wherein Z is selected from a group consisting of O, S, NH, N-methyl, N-ethyl, N-propyl, and N-isopropyl, and wherein the wavy line symbol "∿" indicates a bond linked to F; and wherein $X_2$ and $R_2$ are chosen such that the monomer B comprises a component having between 2 and 50 ester groups and between 2 and 8 unsaturated carbon-carbon double bonds and having a molecular weight of between 200 and 5000 g/mole and wherein the monomer B further comprises a cyclopentane and/or cyclohexane moiety.

7. The biodegradable controlled release agrochemical composition according to claim 1, wherein the monomer B has general structure represented by the following:

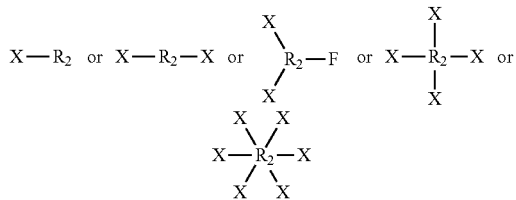

wherein X is represented by the Formula:

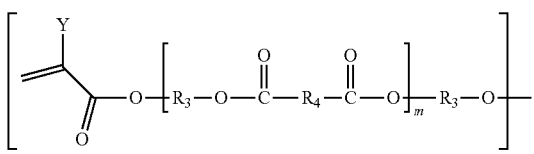

Y is H or $CH_3$,
m is 0 to 20;

$R_3$ is represented by the following structure:

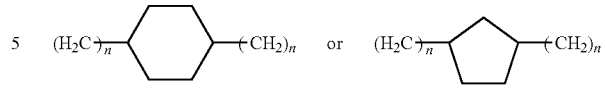

wherein n is an integer between 0 to 20; and
$R_4$ is represented by the following structure:

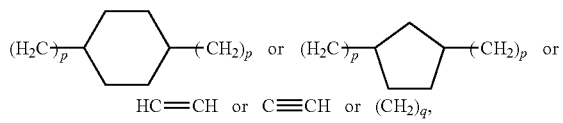

wherein p is an integer between 0 to 20,
q is an integer between 0 to 34; and
$R_2$ is represented by the following structure:

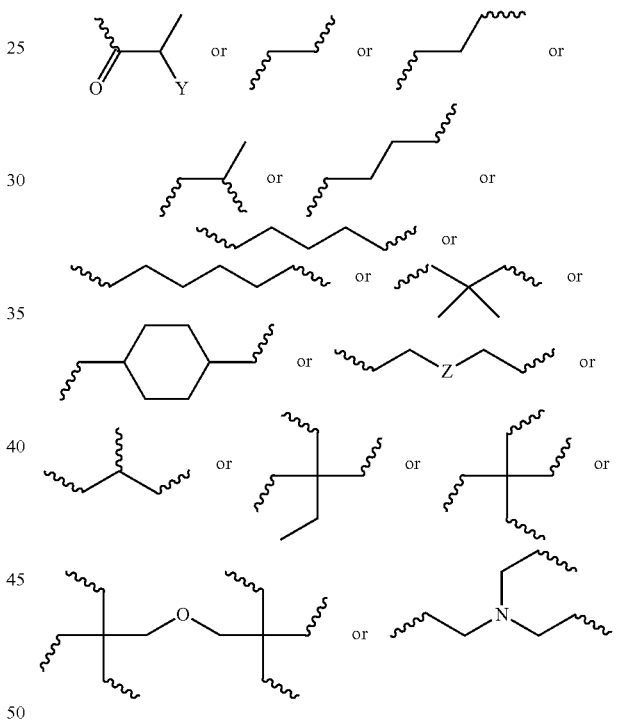

wherein Z is selected from a group consisting of O, S, NH, N-methyl, N-ethyl, N-propyl, and N-isopropyl and wherein the wavy line symbol "∿" indicates a bond linked to X; and wherein X and $R_2$ are chosen such that the monomer B comprises a component having between 2 and 50 ester groups and between 2 and 8 unsaturated carbon-carbon double bonds and having a molecular weight of between 200 and 5000 g/mole.

8. The biodegradable controlled release agrochemical composition according to claim 1, wherein the monomer B comprises a component having a 5- or 6-membered cycloalkyl moiety with at least two (meth)acrylate end groups or having 5- or 6-membered cycloalkyl moieties separated by 1-9 ester bonds and having at least two acrylate or methacrylate end groups.

9. The biodegradable controlled release agrochemical composition according to claim 1, wherein the monomer B comprises a component represented by the following structure:

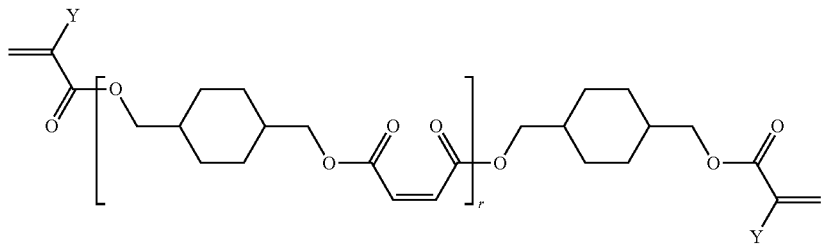

wherein,
r is an integer between 0 to 20 and,
Y is H or $CH_3$
and/or a component represented by following structure:

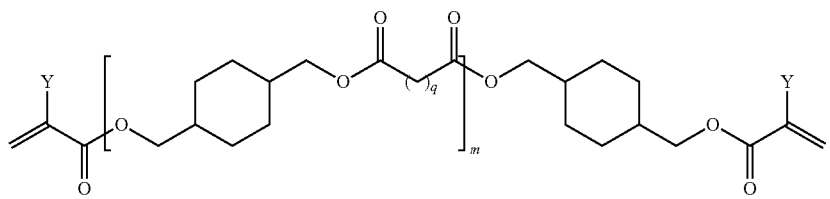

wherein
m is an integer between 0 to 20;
q is an integer between 0 to 34;
Y is H or $CH_3$; and
wherein r is chosen such that the monomer B comprises a component having between 2 and 50 ester groups and between 2 and 8 unsaturated carbon-carbon double bonds and having a molecular weight of between 200 and 5000 g/mole.

10. The biodegradable controlled release agrochemical composition according to claim 1, wherein the adduct is formed by chemical reaction of PETMA and monomer B comprising a component represented by the following structure:

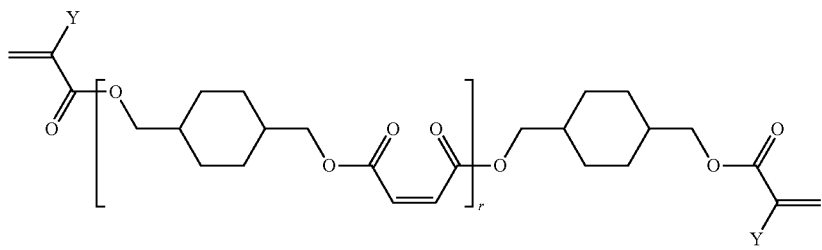

wherein,
r is an integer between 0 to 20, and
Y is H or $CH_3$ and/or a component represented by following structure:

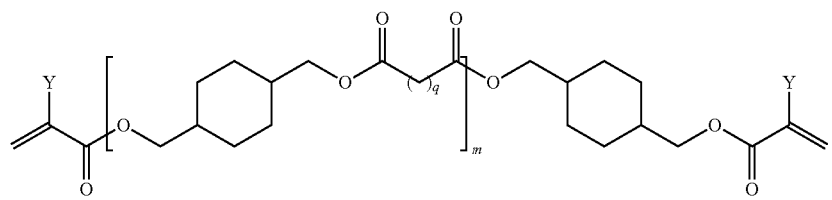

wherein
m is an integer between 0 to 20;
q is an integer between 0 to 34 and
Y is H or $CH_3$,
wherein r is chosen such that the monomer B comprises a component having between 2 and 50 ester groups and between 2 and 8 unsaturated carbon-carbon double bonds and having a molecular weight of between 200 and 5000 g/mole.

11. The biodegradable controlled release agrochemical composition according to claim 1, wherein the adduct is formed by chemical reaction of monomer A with monomer B, wherein the monomer B comprises a component having structure represented by the following:

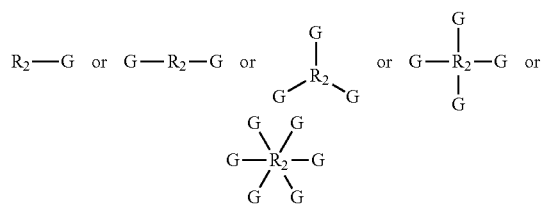

wherein G is represented by the Formula:

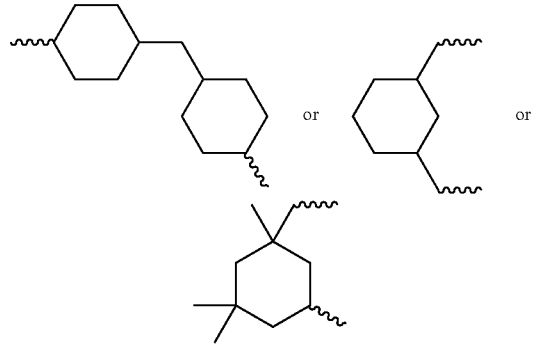

Y is H or $CH_3$; p1 $R_5$ is

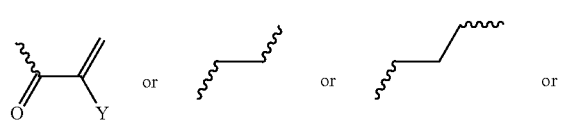

n is an integer between 0 to 20;
s is an integer between 2 to 36;
t is an integer between 0 to 20;
$X_3$ is O, NH, S, $CH_2$;
$R_6$ is represented by the following structure:

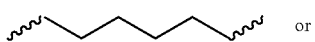 or

-continued

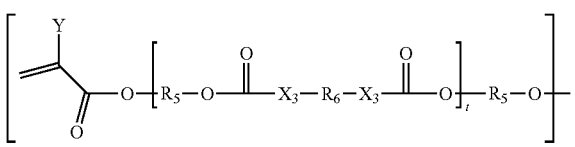

wherein the wavy line symbol "〜" of R6 indicates a bond formed between $R_6$ and $X_3$; and
$R_2$ is represented by the following structure:

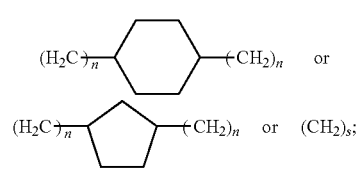

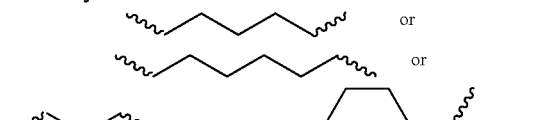

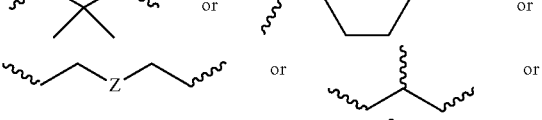

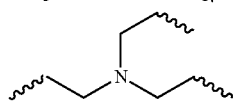

wherein Z is selected from a group consisting of O, S, NH, N-methyl, N-ethyl, N-propyl, and N-isopropyl and wherein the wavy line symbol "〰" indicates a bond linked to G, and wherein $R_2$ and G are chosen such that the monomer B comprises a component having between 2 and 50 ester groups and between 2 and 8 unsaturated carbon-carbon double bonds and having a molecular weight of between 200 and 5000 g/mole.

12. The biodegradable controlled release agrochemical composition according to claim 1, wherein the core material is selected from the group consisting of fertilizers, nitrification inhibitors, de-nitrification inhibitors, urease inhibitors, insecticides, herbicides, fungicides, pheromones, biostimulants, growth regulators and mixtures thereof.

13. The biodegradable controlled release agrochemical composition according to claim 1,
wherein the coating composition exhibits a controlled rate of release of the material at 30 days or more from the date of initial exposure of the material to moisture or water, wherein greater than 75 wt % of the initial weight of the material is released from the coated agrochemical composition, wherein the coating composition has at least about 16% biodegradation within a time period from about 10 to 24 months and wherein the coating composition is adapted such that not more than 15 wt % of the agricultural active material within the first 24 hours, and not more than 75 wt % of said material within 28 days, and at least 75 wt % of said material at 30 days or more is released after initial contact of the coated agrochemical composition with water at ambient temperature.

14. The biodegradable controlled release agrochemical composition according to claim 13, wherein the adduct is formed by chemical reaction of PETMA and monomer B comprising a component represented by following structure:

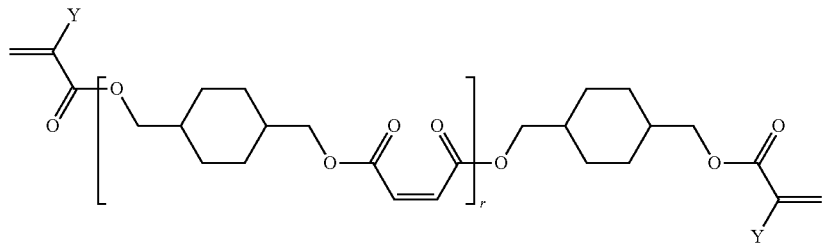

wherein,
r is an integer between 0 to 20; and
Y is H or $CH_3$
and/or a component represented by following structure:

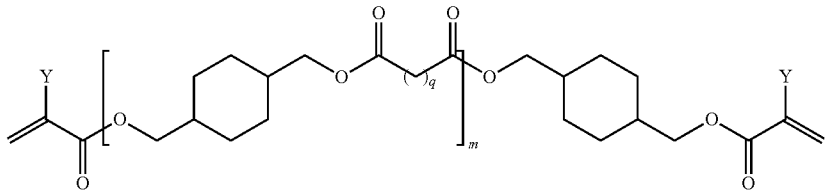

wherein
m is an integer between 0 to 20;
q is an integer between 0 to 34; and
Y is H or $CH_3$,
wherein r is chosen such that the monomer B comprises a component having between 2 and 50 ester groups and between 2 and 8 unsaturated carbon-carbon double bonds and having a molecular weight of between 200 and 5000 g/mole.

15. The biodegradable controlled release agrochemical composition according to claim 13, wherein the core material is selected from the group consisting of fertilizers, nitrification inhibitors, de-nitrification inhibitors, urease inhibitors, insecticides, herbicides, fungicides, pheromones, biostimulants, growth regulators and mixtures thereof.

* * * * *